(12) United States Patent
Sundararajan et al.

(10) Patent No.: US 12,149,482 B2
(45) Date of Patent: *Nov. 19, 2024

(54) CODE BLOCK GROUPING AND FEEDBACK THAT SUPPORT EFFICIENT RETRANSMISSIONS

(71) Applicant: QUALCOMM Incorporated, San Diego, CA (US)

(72) Inventors: Jay Kumar Sundararajan, San Diego, CA (US); Renqiu Wang, San Diego, CA (US); Hao Xu, Beijing (CN); Naga Bhushan, San Diego, CA (US); Haitong Sun, Cupertino, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,277

(22) Filed: Sep. 20, 2023

(65) Prior Publication Data

US 2024/0014984 A1    Jan. 11, 2024

Related U.S. Application Data

(63) Continuation of application No. 17/454,017, filed on Nov. 8, 2021, now Pat. No. 11,799,611, which is a
(Continued)

(51) Int. Cl.
*H04L 1/08* (2006.01)
*H04L 1/00* (2006.01)
(Continued)

(52) U.S. Cl.
CPC .......... *H04L 5/0055* (2013.01); *H04L 1/0003* (2013.01); *H04L 1/0041* (2013.01);
(Continued)

(58) Field of Classification Search
CPC ... H04L 5/0055; H04L 1/0041; H04L 1/0045; H04L 1/1893; H04L 1/1635;
(Continued)

(56) References Cited

U.S. PATENT DOCUMENTS 10,270,579 B2   4/2019   Chendamarai et al.
10,972,227 B2 *  4/2021   Lin ..................... H04W 72/535
(Continued)

FOREIGN PATENT DOCUMENTS

CN          1983913 A      6/2007
CN        104584471 A      4/2015
(Continued)

OTHER PUBLICATIONS

3GPP: "Universal Mobile Telecommunications System (UMTS); UTRAN Iur Interface Radio Network Subsystem Application Part (RNSAP) Signalling", ETSI TS 125 423 V9.5.0 (Mar. 2011) (3GPP TS 25.423 version 9.5.0 Release 9), 1124 Pages.
(Continued)

*Primary Examiner* — Albert Decady
*Assistant Examiner* — Osman M Alshack
(74) *Attorney, Agent, or Firm* — Holland & Hart LLP

(57) ABSTRACT

Methods, systems, and devices for wireless communication are described. A wireless device may transmit feedback, such as hybrid automatic repeat request (HARQ) feedback for groups of code blocks rather than for an entire transport block or individual code blocks. The wireless device may transmit an acknowledgement (ACK) or negative-acknowledgement (NACK) to provide feedback for each code block group of a set of code block groups. An ACK may indicate that code blocks in a code block group were successfully decoded, and a NACK may indicate that at least one code block in a code block group was not successfully decoded. Wireless devices may support several techniques for group-
(Continued)

ing code blocks for feedback reporting to allow for efficient retransmissions and limited overhead. Different grouping schemes may be employed depending on system constraints, device capability, link conditions, or the like.

30 Claims, 18 Drawing Sheets

Related U.S. Application Data continuation of application No. 15/933,110, filed on Mar. 22, 2018, now Pat. No. 11,171,758.

(60) Provisional application No. 62/476,673, filed on Mar. 24, 2017.

(51) Int. Cl.
    *H04L 1/1607* (2023.01)
    *H04L 1/1812* (2023.01)
    *H04L 1/1829* (2023.01)
    *H04L 1/1867* (2023.01)
    *H04L 5/00* (2006.01)

(52) U.S. Cl.
CPC .............. *H04L 1/0045* (2013.01); *H04L 1/08* (2013.01); *H04L 1/1607* (2013.01); *H04L 1/1635* (2013.01); *H04L 1/1861* (2013.01); *H04L 1/1893* (2013.01); *H04L 1/1812* (2013.01)

(58) Field of Classification Search
CPC ... H04L 1/1861; H04L 1/1607; H04L 1/0003; H04L 1/08; H04L 1/18; H04L 1/1812; H04L 1/1816; H04L 1/1819; H04L 1/1822; H04L 1/1825
USPC .......................................... 714/776, 748–750
See application file for complete search history.

(56) References Cited

U.S. PATENT DOCUMENTS

| | | | |
|---|---|---|---|
| 11,171,758 B2 | 11/2021 | Sundararajan et al. | |
| 2008/0225965 A1* | 9/2008 | Pi ........................... | H04B 7/068 714/800 |
| 2009/0274139 A1 | 11/2009 | Palanki | |
| 2009/0279460 A1 | 11/2009 | Sarkar | |
| 2010/0272048 A1 | 10/2010 | Pan et al. | |
| 2011/0154143 A1 | 6/2011 | Eckert | |
| 2011/0211662 A1 | 9/2011 | Varadarajan et al. | |
| 2011/0268080 A1 | 11/2011 | Luo et al. | |
| 2011/0276747 A1* | 11/2011 | Fuchs ................... | H04L 1/0045 711/E12.008 |
| 2011/0280133 A1 | 11/2011 | Chang et al. | |
| 2012/0300722 A1 | 11/2012 | Kim et al. | |
| 2012/0327761 A1* | 12/2012 | Obuchi ................... | H04L 1/201 370/216 |
| 2013/0163573 A1 | 6/2013 | Oizumi et al. | |
| 2013/0176981 A1* | 7/2013 | Earnshaw ............. | H04L 1/1835 370/329 |
| 2014/0053049 A1 | 2/2014 | Chen et al. | |
| 2014/0093021 A1 | 4/2014 | Jain et al. | |
| 2014/0153484 A1* | 6/2014 | Kim ........................ | H04L 1/004 370/328 |
| 2014/0204878 A1 | 7/2014 | Jang et al. | |
| 2014/0313985 A1* | 10/2014 | Nimbalker .......... | H04L 27/0008 370/329 |
| 2015/0039958 A1 | 2/2015 | Vos | |
| 2015/0049709 A1 | 2/2015 | Damnjanovic et al. | |
| 2015/0098403 A1 | 4/2015 | Lidian et al. | |
| 2016/0036578 A1 | 2/2016 | Malladi et al. | |
| 2016/0043854 A1 | 2/2016 | Damnjanovic et al. | |
| 2016/0072612 A1* | 3/2016 | Seo ........................... | H04L 1/22 370/329 |
| 2016/0182204 A1* | 6/2016 | Hsieh ................ | H04W 72/0446 370/329 |
| 2016/0218798 A1 | 7/2016 | Yang et al. | |
| 2016/0226643 A1* | 8/2016 | Mallik .................. | H04L 1/1819 |
| 2016/0233999 A1* | 8/2016 | Chendamarai Kannan ................. | H04W 72/20 |
| 2017/0026297 A1* | 1/2017 | Sun ...................... | H04B 7/0623 |
| 2017/0126247 A1* | 5/2017 | Liu ..................... | H03M 13/036 |
| 2017/0142593 A1 | 5/2017 | Seo et al. | |
| 2017/0207880 A1* | 7/2017 | Sun ...................... | H04L 1/0058 |
| 2017/0207895 A1* | 7/2017 | Yang ..................... | H04W 72/23 |
| 2017/0331591 A1* | 11/2017 | Nammi ................ | H04L 1/0045 |
| 2018/0035409 A1* | 2/2018 | Chmiel ................ | H04L 1/1835 |
| 2018/0241501 A1 | 8/2018 | Olsson et al. | |
| 2018/0278370 A1* | 9/2018 | Jeong .................... | H04L 1/0058 |
| 2019/0386781 A1 | 12/2019 | Lin | |
| 2022/0060304 A1 | 2/2022 | Sundararajan et al. | |

FOREIGN PATENT DOCUMENTS

| | | |
|---|---|---|
| CN | 105474567 A | 4/2016 |
| CN | 105515733 A | 4/2016 |
| CN | 107210866 A | 9/2017 |
| EP | 2269338 A2 | 1/2011 |
| EP | 2838301 A1 | 2/2015 |
| EP | 3603259 A1 | 2/2020 |
| WO | 2014031450 | 2/2014 |
| WO | 2015023659 A1 | 2/2015 |
| WO | 2016003229 A1 | 1/2016 |
| WO | 2016021957 A1 | 2/2016 |
| WO | 2016126653 A1 | 8/2016 |
| WO | 2017095289 A1 | 6/2017 |

OTHER PUBLICATIONS

European Search Report—23161433—Search Authority—The Hague—Apr. 25, 2023.

International Preliminary Report on Patentability—PCT/US2018/024025, The International Bureau of WIPO—Geneva, Switzerland, Oct. 3, 2019.

International Search Report and Written Opinion—PCT/US2018/024025—ISA/EPO—Sep. 10, 2018.

Mediatek Inc: "eMBB Encoding Chain", 3GPP Draft, 3GPP TSG-RAN WG1 NR, R1-1702732_eMBB Encoding Chain_Final, 3rd Generation Partnership Project (3gpp), Mobile Competence Centre; 650, Route Des Lucioles; F-06921 Sophia-Antipol, vol. RAN WG1, No. Athens, Greece; Feb. 13, 2017-Feb. 17, 2017, Feb. 7, 2017, XP051221572, Retrieved from the Internet: URL: http://www.3gpp.org/ftp/tsg_ran/WG1_RL 1/TSGR1_88/Docs/ [retrieved on Feb. 7, 2017], 9 pages.

Mediatek Inc: "On Multiple HARQ Bits Per TB and Feedback Mechanism", 3GPP TSG RAN WG1 Meeting #88, 3GPP Draft, R1-1702738 On Multiple HARQ Bits per TB and Feedback Mechanism_Final, 3rd Generation Partnership Project (3GPP), Mobile Competence Centre, 650, Route Des Lucioles, F-06921 Sophia-Antipolis, vol. RAN WG1, No. Athens, Greece, Feb. 13, 2017-Feb. 17, 2017, Feb. 12, 2017 (Feb. 12, 2017), 4 Pages, XP051209885, section 3.

Partial International Search Report—PCT/US2018/024025—ISA/EPO—Jul. 13, 2018.

Qin L., et al., "Dynamic Spectrum Allocation for LTE System by Exploiting Cognitive Capability", Journal of Electronics Information Technology, Issue 1, Jan. 15, 2015.

Zte et al., "NR HARQ Timing and Feedback Schemes", 3GPP TSG RAN WG1 Meeting #88,Greece, Feb. 13-17, 2017, pp. 1-8.

* cited by examiner

CODE BLOCK GROUPING AND FEEDBACK THAT SUPPORT EFFICIENT RETRANSMISSIONS

CROSS REFERENCES

The present Application for Patent is a Continuation of U.S. patent application Ser. No. 17/454,017 by SUNDARARAJAN et al., entitled "CODE BLOCK GROUPING AND FEEDBACK THAT SUPPORT EFFICIENT RETRANSMISSIONS" filed Nov. 8, 2021, now U.S. Pat. No. 11,799,611, which is a Continuation of U.S. patent application Ser. No. 15/933,110 by SUNDARARAJAN et al., entitled "CODE BLOCK GROUPING AND FEEDBACK THAT SUPPORT EFFICIENT RETRANSMISSIONS" filed Mar. 22, 2018, now U.S. Pat. No. 11,171,758, which claims priority to U.S. Provisional Patent Application No. 62/476,673 by SUNDARARAJAN, et al., entitled "CODE BLOCK GROUPING AND FEEDBACK THAT SUPPORT EFFICIENT RETRANSMISSIONS" filed Mar. 24, 2017, assigned to the assignee hereof, and expressly incorporated herein.

BACKGROUND

The following relates generally to wireless communication and more specifically to code block grouping and feedback that support efficient retransmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, a wireless device may transmit data to a receiving device in the form of transport blocks. The receiving device may decode the transport blocks to identify the data included. A transport block may include several code blocks (e.g., transport blocks may include a few code blocks, tens of code blocks, a few hundred code blocks, etc.). In some examples, the receiving device may not be able to successfully decode all the code blocks in the transport block. Inefficient techniques for reporting feedback about code blocks successfully decoded may result in additional overhead in a wireless communications system.

SUMMARY

Some wireless communications systems may support the use of feedback, such as hybrid automatic repeat request (HARQ) feedback, to indicate whether data received from a wireless device was successfully decoded. A wireless device may transmit HARQ feedback for groups of code blocks rather than for an entire transport block or individual code blocks. For example, the wireless device may transmit an acknowledgement (ACK) or negative-acknowledgement (NACK) to provide feedback for each code block group of a set of code block groups. An ACK may indicate that code blocks in a code block group were successfully decoded, and a NACK may indicate that at least one code block in a code block group was not successfully decoded. Wireless devices may support several techniques for grouping code blocks for feedback reporting.

As an example, a wireless device may group code blocks into non-overlapping code block groups or overlapping code block groups. The grouping may be logical—i.e., feedback may be provided for several code blocks, and the grouping represented by the feedback may be different from a physical arrangement, transmission time, reception time, or the like, for the code bocks. The use of non-overlapping code block groups for feedback reporting may limit overhead in a wireless communications system since a wireless device may transmit less detailed feedback. However, in some cases, the transmission of less detailed feedback may result in additional unnecessary retransmissions of code blocks. Alternatively, the use of overlapping code block groups for feedback reporting may allow for more detailed feedback, which may optimize retransmissions of code blocks. However, the transmission of more detailed feedback may result in high overhead, in some cases. A wireless device may support efficient techniques for selecting a method of grouping code blocks for feedback reporting in order to limit overhead and unnecessary retransmissions in a wireless communications system.

A method of wireless communication is described. The method may include receiving one or more transport blocks that comprise a plurality of code blocks, receiving an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and transmitting an acknowledgement or negative-acknowledgement for each code block group based at least in part on the indication.

An apparatus for wireless communication is described. The apparatus may include means for receiving one or more transport blocks that comprise a plurality of code blocks, means for receiving an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and means for transmitting an acknowledgement or negative-acknowledgement for each code block group based at least in part on the indication.

Another apparatus for wireless communication is described. The apparatus may include a processor, memory in electronic communication with the processor, and instructions stored in the memory. The instructions may be operable to cause the processor to receive one or more transport blocks that comprise a plurality of code blocks, receive an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and transmit an acknowledgement or negative-acknowledgement for each code block group based at least in part on the indication.

A non-transitory computer-readable medium for wireless communication is described. The non-transitory computer-readable medium may include instructions operable to cause a processor to receive one or more transport blocks that comprise a plurality of code blocks, receive an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and transmit an acknowledgement or negative-acknowledgement for each code block group based at least in part on the indication.

In some examples of the method, apparatus, and non-transitory computer-readable medium described above, the acknowledgement indicates that code blocks within a code block group were successfully decoded. In some examples of the method, apparatus, and non-transitory computer-readable medium described above, the negative-acknowledgement indicates that at least one code block in a code block group was not successfully decoded.

Some examples of the method, apparatus, and non-transitory computer-readable medium described above may further include processes, features, means, or instructions for identifying that each code block group comprises a distinct subset of code blocks of the plurality of code blocks based at least in part on the indication.

In some examples of the method, apparatus, and non-transitory computer-readable medium described above, each code block group comprises a same number of code blocks.

In some examples of the method, apparatus, and non-transitory computer-readable medium described above, each code block group of the or more code blocks of the first size comprises a same number of code blocks. In some examples of the method, apparatus, and non-transitory computer-readable medium described above, the second set of code blocks comprises a remaining set of code blocks that may be distributed to one code block group of the second size.

In some examples of the method, apparatus, and non-transitory computer-readable medium described above, the one or more code block groups of the first size comprise a first plurality of code block groups of the first size. In some examples of the method, apparatus, and non-transitory computer-readable medium described above, the one or more code block groups of the second size comprise a second plurality of code block groups of the second size.

Some examples of the method, apparatus, and non-transitory computer-readable medium described above may further include processes, features, means, or instructions for receiving an indication of a number of code block groups to be formed, wherein code blocks of the plurality of code blocks may be grouped based at least in part on the indication of the number of code block groups to be formed.

In some examples of the method, apparatus, and non-transitory computer-readable medium described above, adjacent sets of two or more code blocks of the plurality of code blocks may be within a same code block group.

In some examples of the method, apparatus, and non-transitory computer-readable medium described above, the adjacent sets of two or more code blocks of the plurality of code blocks may be adjacent in a time domain or a frequency domain.

In some examples of the method, apparatus, and non-transitory computer-readable medium described above, a code block group comprises multiple code block groups.

Some examples of the method, apparatus, and non-transitory computer-readable medium described above may further include processes, features, means, or instructions for identifying a grouping of the code blocks of the plurality of code blocks based at least in part on a type of service associated with the one or more transport blocks, or a modulation and coding scheme (MCS) used to transmit the one or more transport blocks, or a combination thereof.

A method of wireless communication is described. The method may include receiving one or more transport blocks that comprise a plurality of code blocks, receiving an indication to group code blocks of the plurality of code blocks for feedback reporting, wherein at least one of the code blocks of the plurality of code blocks is included in two or more code block groups of a plurality of code block groups, and transmitting an acknowledgement or negative-acknowledgement for each code block group based at least in part on the indication.

An apparatus for wireless communication is described. The apparatus may include means for receiving one or more transport blocks that comprise a plurality of code blocks, means for receiving an indication to group code blocks of the plurality of code blocks for feedback reporting, wherein at least one of the code blocks of the plurality of code blocks is included in two or more code block groups of a plurality of code block groups, and means for transmitting an acknowledgement or negative-acknowledgement for each code block group based at least in part on the indication.

Another apparatus for wireless communication is described. The apparatus may include a processor, memory in electronic communication with the processor, and instructions stored in the memory. The instructions may be operable to cause the processor to receive one or more transport blocks that comprise a plurality of code blocks, receive an indication to group code blocks of the plurality of code blocks for feedback reporting, wherein at least one of the code blocks of the plurality of code blocks is included in two or more code block groups of a plurality of code block groups, and transmit an acknowledgement or negative-acknowledgement for each code block group based at least in part on the indication.

A non-transitory computer-readable medium for wireless communication is described. The non-transitory computer-readable medium may include instructions operable to cause a processor to receive one or more transport blocks that comprise a plurality of code blocks, receive an indication to group code blocks of the plurality of code blocks for feedback reporting, wherein at least one of the code blocks of the plurality of code blocks is included in two or more code block groups of a plurality of code block groups, and transmit an acknowledgement or negative-acknowledgement for each code block group based at least in part on the indication.

In some examples of the method, apparatus, and non-transitory computer-readable medium described above, the acknowledgement indicates that code blocks within a code block group were successfully decoded. In some examples of the method, apparatus, and non-transitory computer-readable medium described above, the negative-acknowledgement indicates that at least one code block in a code block group was not successfully decoded.

In some examples of the method, apparatus, and non-transitory computer-readable medium described above, the plurality of code blocks may be grouped into a first plurality of code block groups. In some examples of the method, apparatus, and non-transitory computer-readable medium described above, the plurality of code blocks may be grouped into a second plurality of code block groups, wherein each code block group of the second plurality of code block groups comprises a code block from each of the first plurality of code block groups.

In some examples of the method, apparatus, and non-transitory computer-readable medium described above, each code block of the plurality of code blocks may be distributed to a different combination of code block groups.

Some examples of the method, apparatus, and non-transitory computer-readable medium described above may further include processes, features, means, or instructions for receiving an indication of a number of code block groups to be formed, wherein code blocks of the plurality of code blocks may be grouped based at least in part on the indication of the number of code block groups to be formed.

In some examples of the method, apparatus, and non-transitory computer-readable medium described above, adjacent sets of two or more code blocks of the plurality of code blocks may be within a same code block group.

In some examples of the method, apparatus, and non-transitory computer-readable medium described above, a code block group comprises multiple code block groups.

Some examples of the method, apparatus, and non-transitory computer-readable medium described above may further include processes, features, means, or instructions for identifying a grouping of the code blocks of the plurality of code blocks based at least in part on a type of service associated with the one or more transport blocks, or a modulation and coding scheme (MCS) used to transmit the one or more transport blocks, or a combination thereof.

A method of wireless communication is described. The method may include transmitting one or more transport blocks that comprise a plurality of code blocks, transmitting an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and receiving an acknowledgement or negative-acknowledgement for each code block group based at least in part on the indication.

An apparatus for wireless communication is described. The apparatus may include means for transmitting one or more transport blocks that comprise a plurality of code blocks, means for transmitting an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and means for receiving an acknowledgement or negative-acknowledgement for each code block group based at least in part on the indication.

Another apparatus for wireless communication is described. The apparatus may include a processor, memory in electronic communication with the processor, and instructions stored in the memory. The instructions may be operable to cause the processor to transmit one or more transport blocks that comprise a plurality of code blocks, transmit an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and receive an acknowledgement or negative-acknowledgement for each code block group based at least in part on the indication.

A non-transitory computer-readable medium for wireless communication is described. The non-transitory computer-readable medium may include instructions operable to cause a processor to transmit one or more transport blocks that comprise a plurality of code blocks, transmit an indication to group code blocks of the plurality of code blocks for feedback reporting, wherein a first set of code blocks of the plurality of code blocks are grouped into one or more code block groups of a first size, and a second set of code blocks of the plurality of code blocks are grouped into one or more code block groups of a second size, and receive an acknowledgement or negative-acknowledgement for each code block group based at least in part on the indication.

In some examples of the method, apparatus, and non-transitory computer-readable medium described above, each code block group comprises a distinct subset of code blocks of the plurality of code blocks.

In some examples of the method, apparatus, and non-transitory computer-readable medium described above, each code block group comprises a same number of code blocks.

In some examples of the method, apparatus, and non-transitory computer-readable medium described above, each code block group of the one or more code block groups of the first size comprises a same number of code blocks. In some examples of the method, apparatus, and non-transitory computer-readable medium described above, the second set of code blocks comprises a remaining set of code blocks that may be distributed to one code block group of the second size.

In some examples of the method, apparatus, and non-transitory computer-readable medium described above, the one or more code block groups of the first size comprise a first plurality of code block groups of the first size. In some examples of the method, apparatus, and non-transitory computer-readable medium described above, the one or more code block groups of the second size comprise a second plurality of code block groups of the second size.

Some examples of the method, apparatus, and non-transitory computer-readable medium described above may further include processes, features, means, or instructions for determining one or more code blocks for retransmission based at least in part on the indication and the received acknowledgement or negative-acknowledgement for each code block group. Some examples of the method, apparatus, and non-transitory computer-readable medium described above may further include processes, features, means, or instructions for retransmitting the one or more code blocks based at least in part on the determination.

A method of wireless communication is described. The method may include transmitting one or more transport blocks that comprise a plurality of code blocks, transmitting an indication to group code blocks of the plurality of code blocks for feedback reporting, wherein at least one of the code blocks of the plurality of code blocks is included in two or more code block groups of a plurality of code block groups, and receiving an acknowledgement or negative-acknowledgement for each code block group based at least in part on the indication.

An apparatus for wireless communication is described. The apparatus may include means for transmitting one or more transport blocks that comprise a plurality of code blocks, means for transmitting an indication to group code blocks of the plurality of code blocks for feedback reporting, wherein at least one of the code blocks of the plurality of code blocks is included in two or more code block groups of a plurality of code block groups, and means for receiving an acknowledgement or negative-acknowledgement for each code block group based at least in part on the indication.

Another apparatus for wireless communication is described. The apparatus may include a processor, memory in electronic communication with the processor, and instructions stored in the memory. The instructions may be operable to cause the processor to transmit one or more transport blocks that comprise a plurality of code blocks, transmit an indication to group code blocks of the plurality of code blocks for feedback reporting, wherein at least one of the code blocks of the plurality of code blocks is included in two or more code block groups of a plurality of code block groups, and receive an acknowledgement or negative-acknowledgement for each code block group based at least in part on the indication.

A non-transitory computer-readable medium for wireless communication is described. The non-transitory computer-readable medium may include instructions operable to cause a processor to transmit one or more transport blocks that comprise a plurality of code blocks, transmit an indication to group code blocks of the plurality of code blocks for feedback reporting, wherein at least one of the code blocks of the plurality of code blocks is included in two or more code block groups of a plurality of code block groups, and receive an acknowledgement or negative-acknowledgement for each code block group based at least in part on the indication.

In some examples of the method, apparatus, and non-transitory computer-readable medium described above, the plurality of code blocks may be grouped into a first plurality of code block groups. In some examples of the method, apparatus, and non-transitory computer-readable medium described above, the plurality of code blocks may be grouped into a second plurality of code block groups, wherein each code block group of the second plurality of code block groups comprises a code block from each of the first plurality of code block groups.

In some examples of the method, apparatus, and non-transitory computer-readable medium described above, each code block of the plurality of code blocks may be distributed to a different combination of code block groups.

Some examples of the method, apparatus, and non-transitory computer-readable medium described above may further include processes, features, means, or instructions for transmitting an indication of a number of code block groups to be formed, wherein code blocks of the plurality of code blocks may be grouped based at least in part on the indication of the number of code block groups to be formed.

Some examples of the method, apparatus, and non-transitory computer-readable medium described above may further include processes, features, means, or instructions for determining one or more code blocks for retransmission based at least in part on the indication and the received acknowledgement or negative-acknowledgement for each code block group. Some examples of the method, apparatus, and non-transitory computer-readable medium described above may further include processes, features, means, or instructions for retransmitting the one or more code blocks based at least in part on the determination.

DETAILED DESCRIPTION

A wireless device may transmit feedback, such as hybrid automatic repeat request (HARQ) feedback, for groups of code blocks rather than for an entire transport block or individual code blocks. The wireless device may transmit an acknowledgement (ACK) or negative-acknowledgement (NACK) to provide feedback for each code block group of a set of code block groups.

By way of example, in some wireless communications systems, a wireless device may transmit data in the form of transport blocks that may include multiple code blocks. In some cases, a receiving device may transmit an ACK or NACK to indicate whether a transport block or an individual code block was successfully received and decoded. In the event that the receiving device is unable to successfully decode a subset of code blocks in the transport block, the transmission of ACK/NACK feedback for an entire transport block may result in unnecessary retransmissions. Further, the transmission of ACK/NACK feedback for individual code blocks may result in high overhead. Efficient techniques for grouping code blocks for feedback reporting may be desirable to limit overhead and unnecessary retransmissions of code blocks in a wireless communications system.

As described herein, a wireless communications system may support efficient techniques for grouping code blocks of a transmission for feedback reporting. In some cases, a wireless device may group code blocks into non-overlapping code block groups, where each code block group includes a distinct subset of code blocks. In other cases, a wireless device may group code blocks into overlapping code block groups, where at least two (2) code block groups include a common code block. A wireless device may determine a method for grouping code blocks based on several factors in order to limit overhead and reduce the number of unnecessary retransmissions. For example, the wireless device may group code blocks based on a type of service associated with the transmission of the code blocks (e.g., a low latency service, a high reliability service, or a low latency high reliability service), the probability that code blocks of the transmission may be decoded successfully, channel conditions, etc.

Aspects of the disclosure introduced above are described below in the context of a wireless communications system. Examples of processes and signaling exchanges that support code block grouping methods that support efficient retransmissions are then described. Aspects of the disclosure are further illustrated by and described with reference to apparatus diagrams, system diagrams, and flowcharts that relate to code block grouping methods that support efficient retransmissions.

Figure 1:
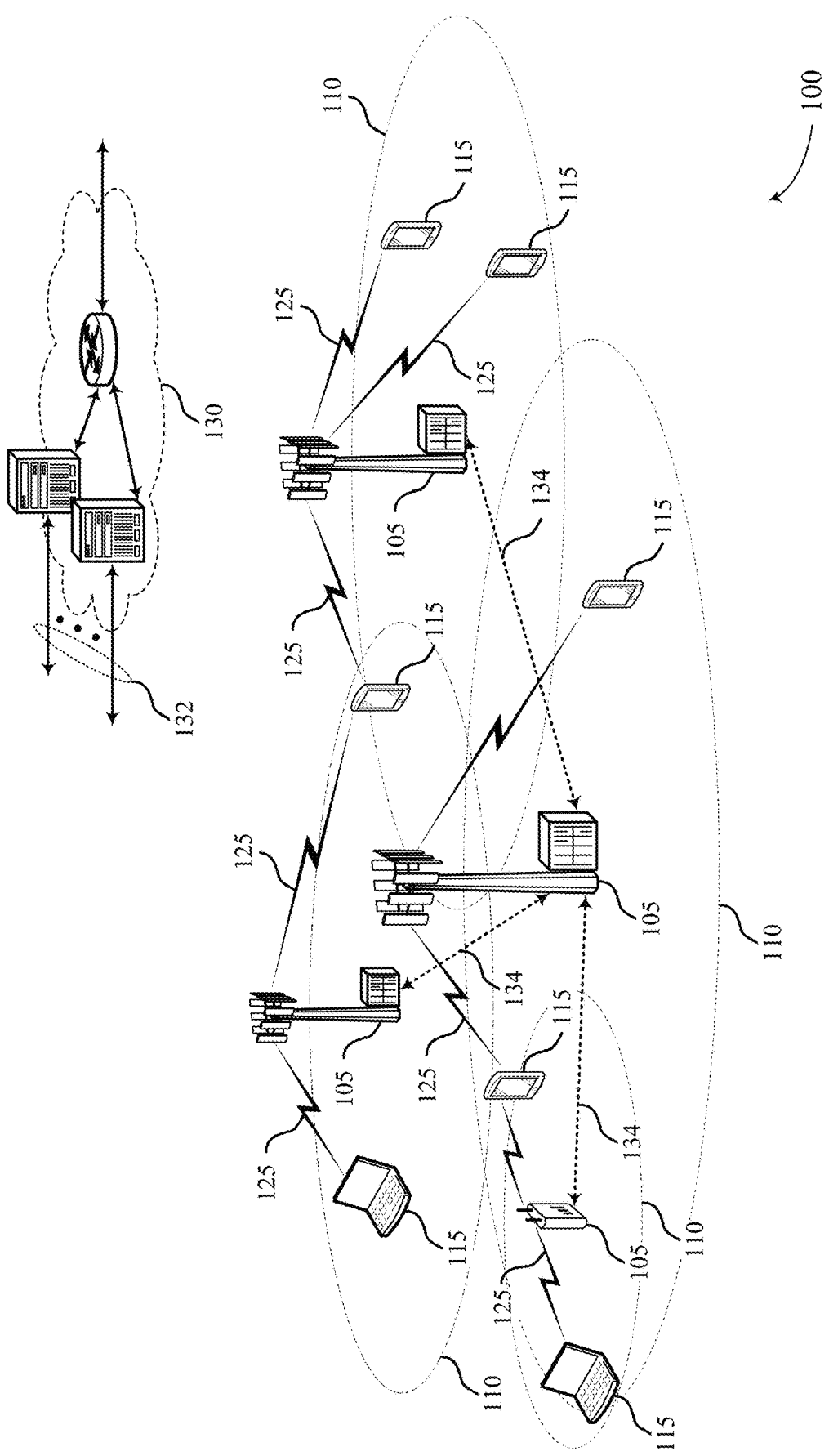
FIG. 1 illustrates an example of a wireless communications system that supports code block grouping and feedback that support efficient retransmissions in accordance with various aspects of the present disclosure.

FIG. 1 illustrates an example of a wireless communications system 100 that supports code block grouping and feedback that support efficient retransmissions in accordance with various aspects of the present disclosure. The wireless communications system 100 includes base stations 105, UEs 115, and a core network 130. In some examples, the wireless communications system 100 may be a Long Term Evolution (LTE), a LTE-Advanced (LTE-A) network, or a New Radio (NR) network. In some cases, wireless communications system 100 may support mobile broadband (MBB) communications, ultra-reliable (i.e., mission critical) communications, low latency communications, and communications with low-cost and low-complexity devices (e.g., machine-type communication (MTC) devices).

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, an automobile component, a train, a train component, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeB s (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 (or network device), or core network 130 supporting radio bearers for user plane data. At the Physical (PHY) layer, transport channels may be mapped to physical channels.

In some cases, UEs 115 and base stations 105 may support retransmissions of data to increase the chances that data is received successfully. HARQ feedback is one technique of increasing the likelihood that data is received correctly over a wireless communication link 125. HARQ may include a combination of error detection techniques (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). A UE 115 may transmit an ACK to a base station 105 to indicate that a transmission from the base station 105 was successfully decoded, and the UE 115 may transmit a NACK to the base station 105 to indicate that a transmission from the base station 105 was not successfully decoded. Similarly, a base station 105 may transmit an ACK to a UE 115 to indicate that a transmission from the UE 115 was successfully decoded, and the base station 105 may transmit a NACK to the UE 115 to indicate that a transmission from the UE 115 was not successfully decoded.

In wireless communications system 100, a UE 115 or base station 105 may receive data in the form of transport blocks from a UE 115 or base station 105. The transport block may be segmented into a number of code blocks of different or equal sizes. In some cases, a wireless device may transmit an ACK or NACK for the transport block to indicate whether the entire transport block was successfully decoded. In such cases, however, although the wireless device may not have been able to successfully decode some code blocks of the transport block, the wireless device may have been able to successfully decode other code blocks of the transport block. As such, the transmission of a NACK may result in unnecessary retransmissions of some code blocks of the transport block. In other cases, a wireless device may transmit an ACK or NACK for each code block included in a transport block. However, the transmission of an ACK or NACK for each code block of a transport block may result in high overhead (e.g., when the transport block includes a large number of code blocks).

To limit overhead and reduce the number of unnecessary retransmissions in a wireless communications system, wireless devices may transmit HARQ feedback (e.g., ACK or NACK) for a group of code blocks rather than for an entire transport block or for individual code blocks. However, if code blocks are grouped inefficiently, the wireless communications system may still experience high overhead and a large number of unnecessary retransmissions. For example, if the number of code block groups is much lower than the number of code blocks transmitted, the overhead associated with ACK/NACK transmissions may be low. However, because the feedback is limited, a transmitting device may not be able to identify code blocks that were not successfully decoded. As such, the transmitting device may retransmit code blocks that were already decoded by a receiving device. Alternatively, if the number of code block groups is slightly less than the number of code blocks transmitted, the overhead of ACK/NACK transmissions may be high.

Wireless communications system 100 may support efficient techniques for grouping code blocks into code block groups for feedback reporting to limit overhead and unnecessary retransmissions. A base station 105 may transmit an indication to a UE 115 instructing the UE 115 to group code blocks for feedback reporting, or the base station 105 may transmit an indication to the UE 115 that code blocks received from the UE 115 were grouped for feedback purposes. In some cases, code blocks may be grouped into code block groups that do not overlap, and, in other cases, code blocks may be grouped into code block groups that do overlap to some extent, for instance, where two code block groups share a common code block. In other cases, a wireless device may group a portion of code blocks of a transport block into code block groups that overlap, and the wireless device may group another portion of code blocks of the transport block into code block groups that do not overlap. The method used to group code blocks of a transmission for feedback reporting may be selected (e.g., dynamically) based on several factors to limit overhead and reduce unnecessary retransmissions.

Figure 2:
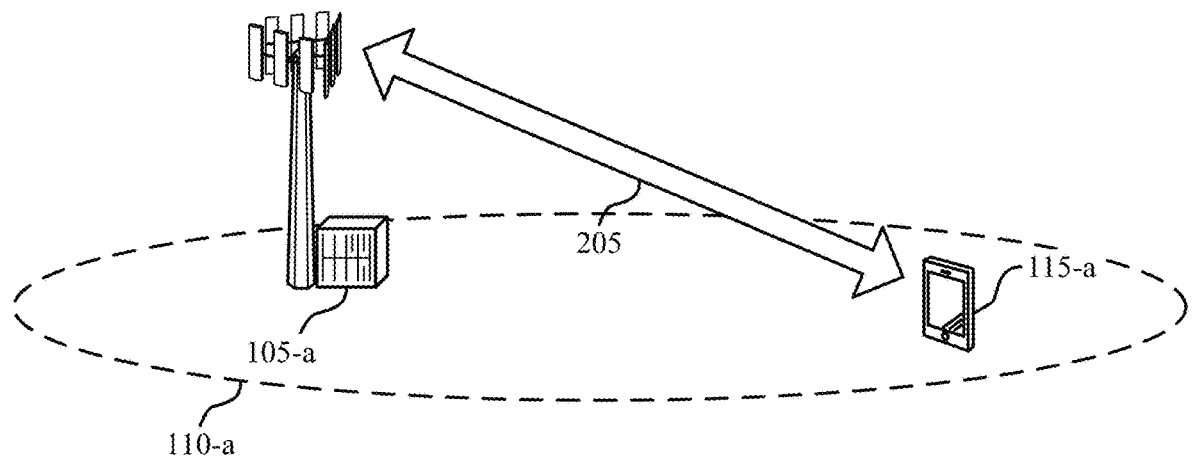
FIG. 2 illustrates an example of a wireless communications system that supports code block grouping and feedback that support efficient retransmissions in accordance with various aspects of the present disclosure.

FIG. 2 illustrates an example of a wireless communications system 200 that supports code block grouping methods that support efficient retransmissions in accordance with various aspects of the present disclosure. Wireless communications system 200 includes base station 105-*a* and UE 115-*a*, which may be examples of a base station 105 and a UE 115 described with reference to FIGS. 1, 5, and 6. Base station 105-*a* provides communication coverage for coverage area 110-*a*. Base station 105-*a* may communicate with UE 115-*a* on resources of a carrier 205. Wireless communications system 200 may support efficient techniques for grouping code blocks for feedback reporting. In some cases, wireless communications system 200 may operate in mmW spectrum.

Base station 105-*a* and UE 115-*a* may group code blocks to limit overhead and reduce the number of unnecessary retransmissions in wireless communications system 200, based on various factors. In some cases, base station 105-*a* and UE 115-*a* may group code blocks for feedback reporting based on a service associated with the transmission of the code blocks. For example, base station 105-*a* and UE 115-*a* may identify a potentially different method for grouping code blocks based on determining if the transmission of the code blocks is associated with low latency communications, MBB communications, MTC communications, etc. In some cases, UE 115-*a* may be semi-statically or statically configured with a set of code block grouping mechanisms for each service type, and UE 115-*a* may identify which code block grouping mechanism in the set to use based on an indication from base station 105-*a*.

Additionally or alternatively, base station 105-*a* and UE 115-*a* may group code blocks for feedback reporting based on a target error rate for decoding code blocks. The target error rate may depend on a modulation and coding scheme (MCS) used to transmit the code blocks, rate control loop parameters, etc. Base station 105-*a* and UE 115-*a* may also group code blocks for feedback reporting based on channel conditions. For example, a wireless device may determine that an MCS selection may not be accurate for certain channel conditions (e.g., a high Doppler environment), and, in such cases, the wireless device may group code blocks to allow for more detailed feedback.

Base station 105-*a* and UE 115-*a* may support several methods of grouping code blocks for feedback reporting based on the above factors. As described with reference to FIG. 1, a base station 105-*a* and a UE 115-*a* may support techniques for grouping code blocks into code block groups such that none of the code block groups overlap. Specifically, the code block groups formed may each include distinct subsets of code blocks of one or more transport blocks. Alternatively, base station 105-*a* and UE 115-*a* may support techniques for grouping code blocks into code block groups such that at least two (2) code block groups overlap. Specifically, at least two (2) code block groups may include a same code block.

The use of non-overlapping code block groups may help to limit overhead since the number of ACK/NACK messages transmitted for one or more transport blocks may be low. However, this technique may result in several unnecessary retransmissions of code blocks since the feedback may not be detailed. Alternatively, the use of overlapping code block groups may help to limit unnecessary retransmissions since the feedback reported in this case may be detailed. Specifically, the overlap may allow information about the decoding status of a code block to be incorporated into more than one ACK/NACK bit, since the code block may be a part of more than one code block group. However, this technique may result in high overhead. Base station 105-*a* and UE 115-*a* may support techniques for statically or dynamically selecting whether to form non-overlapping or overlapping code block groups, and may be able to consider the trade-offs of using either technique to ensure efficient transmission of ACK/NACK feedback.

Figure 3:
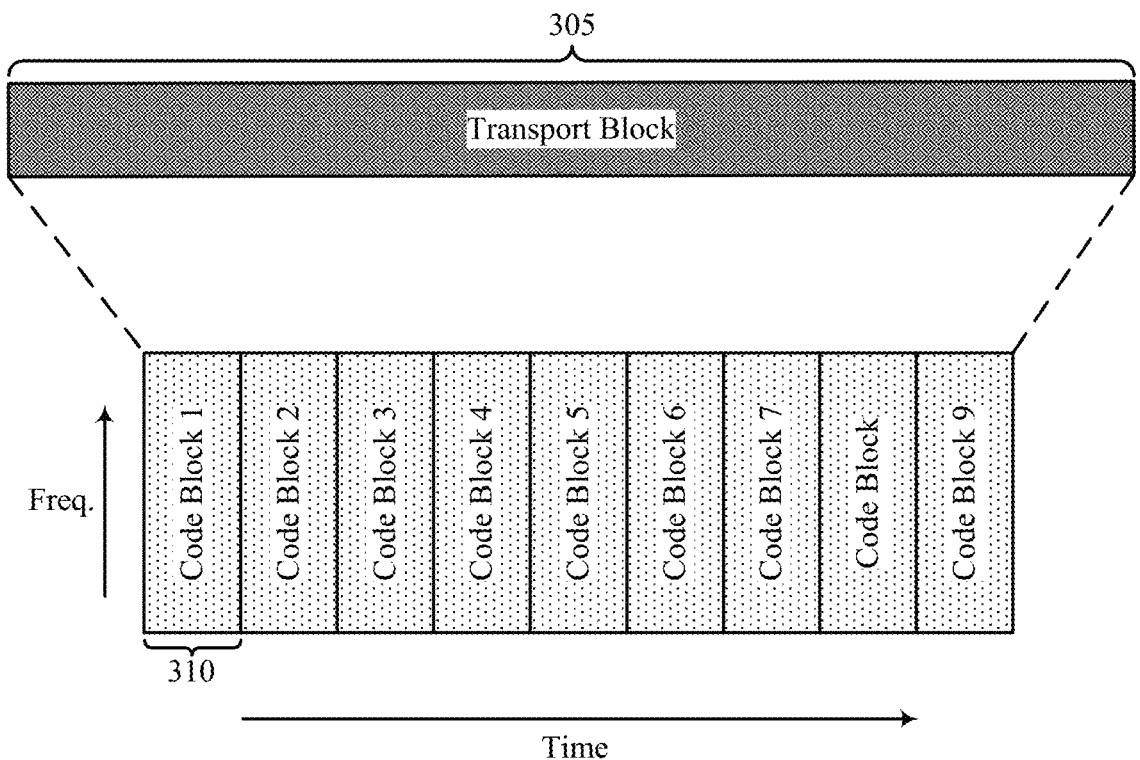
FIGS. 3-4 illustrate example transmissions of code blocks in accordance with various aspects of the present disclosure.

FIG. 3 illustrates an example of a transmission of code blocks 300 in accordance with various aspects of the present disclosure. Although the example of FIG. 3 is described for a downlink transmission, it is to be understood that the techniques described also apply to uplink communication. In some cases, transmission of code blocks 300 may be performed by a base station or a UE, which may be examples of a base station 105 and a UE 115, as described with reference to FIGS. 1 and 2.

A base station may transmit data in the form of a transport block 305 to a UE. The transport block may include a number of code blocks 310 for decoding. The base station may also transmit an indication to group code blocks 310 of the transport block 305 into code block groups for feedback reporting. That is, the base station may indicate that the UE should transmit HARQ feedback (i.e., ACK/NACK feedback) for code block groups rather than for the entire transport block 305 or for individual code blocks 310 of the transmission. In some cases, at least one of the code blocks of the plurality of code blocks 310 may be included in two or more code block groups (i.e., overlapping code block groups).

The indication to group the code blocks may include an indication of the number of code block groups to be formed. The UE may then group code blocks of the transmission based on the indicated number of code block groups to be formed and a number of code blocks included in the transmission. In some cases, the base station may identify a probability of decoding each code block of the transmission, and the base station may indicate to the UE how to group code blocks of the transmission based on this probability. For example, if the probability of decoding code blocks of the transmission is high, the base station may form non-overlapping code block groups for feedback reporting to provide less detailed feedback and limit overhead. Alternatively, if the probability of decoding code blocks of a transmission is low, the base station may form overlapping code block groups to provide more detailed feedback and limit unnecessary retransmissions.

The UE may support several techniques for forming non-overlapping code block groups for feedback reporting. In some cases, if the number of code blocks included in a transmission is an integer multiple of a number of code block groups to be formed, a UE may form code block groups of the same size. However, if the number of code blocks included in a transmission is not an integer multiple of a number of code block groups to be formed, the code block groups formed may not all be of the same size. In one example, the UE may group a first number of code blocks into equally sized groups, and the UE may distribute a remaining number of code blocks to one of the code block groups (e.g., a last code block group).

An exemplary scheme to group code blocks is shown in Equations 1 and 2 below:

$$K = \left\lfloor \frac{M}{N} \right\rfloor \quad (1)$$

$$R = M - (N-1)K \quad (2)$$

where M is the number of code blocks in a transmission, N is the number of code block groups to be formed, K is the number of code blocks initially distributed to each code block group, and R is the remaining number of code blocks distributed to code block N. As an example, if M=8 and N=3, then K=2 and the code blocks are initially grouped into groups of two (2) to produce the following code block groups: {1, 2}, {3, 4}, {5, 6}. The remaining number of code blocks is then calculated to be two (2) based on equation 2 above, and the remaining two (2) code blocks are distributed to code block group N such that the resulting code block groups are as follows: {1, 2}, {3, 4}, {5, 6, 7, 8}.

In another example, the UE may group a first number of code blocks into a first number of code block groups of one size, and the UE may group a second number of code blocks into a second number of code block groups of another size. Another exemplary scheme for distributing code blocks is shown in Equations 3, 4, and 5 below:

$$K = \left\lfloor \frac{M}{N} \right\rfloor \quad (3)$$

First Number of Code Block Groups=$N-(M-NK)$ (4)

Second Number of Code Block Groups=$M-NK$ (5)

where M is the number of code blocks in a transmission, N is the number of code block groups to be formed, K is a number of code blocks to be included in a first number of code block groups of a first size, and K+1 is a number of code blocks to be included in a second number of code block groups of a second size. As an example, if M=8 and N=3, then K=2, a first number of code block groups=b 1, and a second number of code block groups=2. Accordingly, two (2) code blocks are included in a first code block group and three (3) code blocks are included in the second and third code block groups such that the resulting code block groups are as follows: {1, 2}, {3, 4, 5}, and {6, 7, 8}.

The UE may also support several techniques for forming overlapping code block groups for feedback reporting. For instance, a UE may form a first set of code block groups including the code blocks 310 of transport block 305, and the UE may form a second set of code block groups including the code blocks 310 of transport block 305. Each code block group of the second set may include one transport block from each of the code block groups of the first set. An example of the arrangement of code block groups is illustrated in code block grouping grid 315. In this arrangement, code blocks 310 are arranged in an L×L grid, where $$M=L^2 \text{ and } N=2L \quad (6)$$

Thus, code block groups 320 are formed from the rows and columns of the grid. As an example, if M=8 and N=6, then L=3, and the resulting code block groups are as follows: {1, 2, 3}, {4, 5, 6}, {7, 8, 9}, {1, 4, 7}, {2, 5, 8}, and {3, 6, 9}.

The techniques described above may also be applicable for grouping a set of code blocks in a grid where a number of columns of the grid is not equal to a number of rows of the grid. In addition, the techniques described above may be generalized to use a grid arrangement in three (3) or more dimensions. As an example, M=125 code blocks may be arranged into five (5) layers, where each layer has a 5×5 grid of code blocks. Each code block group may then correspond to the 25 code blocks in each 5×5 slice in each of the three dimensions, resulting in 15 groups. Alternatively, each code block group may correspond to the five (5) code blocks in the same row and same layer, or the same column and same layer, or the same row and same column.

In another example, a UE may identify combinations of code block groups, and the UE may distribute each code block received from a base station to a distinct combination of code block groups. This may be applicable if the number of combinations of code block groups (e.g., combinations of a predetermined size) equals, or exceeds the number of code blocks in a transmission. That is, such grouping may be employed for combinations of code block groups that satisfy, for example, the following equation:

$$M \le N \text{ choose } R = \frac{N!}{R!(N-R)!} \tag{7}$$

where M is a number of code blocks of a transmission, N is a number of code blocks to be formed, and R is the size of each combination. Each code block of the transmission may be included in R code block groups where the $j^{th}$ code block may be assigned to the $j^{th}$ combination of code block groups (e.g., code block 1 may be assigned to a first combination of code block groups). As such, the number of code blocks in each code block group may be determined based on the following equation:

$$\text{Number of code blocks in each group} = \frac{MR}{N} = (N-1 \text{ choose } R-1) \tag{8}$$

As an example, if M=6, N=4, and R=2, the different combinations of code block groups may be as follows: {Group 1, Group 2}, {Group 1, Group 3}, {Group 1, Group 4}, {Group 2, Group 3}, {Group 2, Group 4}, and {Group 3, Group 4}. Accordingly, code block 1 may be assigned to code block groups 1 and 2, code block 2 may be assigned to code block groups 1 and 3, code block 3 may be assigned to code block groups 1 and 4, etc. The resulting code block groups are as follows: {1, 2, 3}, {1, 4, 5}, {2, 4, 6}, and {3, 5, 6}.

The examples and grouping schemes described herein provide options for grouping code blocks for feedback reporting, and the dynamic selection of a method or grouping scheme may allow a wireless device to limit overhead and unnecessary retransmissions. Although the schemes are described herein individually, it is to be understood that a combination of the methods and schemes may be applied for grouping a number of code blocks (M) received from a base station into a number of code block groups (N). That is, a UE may apply one method or scheme to a first subset ($M_1$) of a set of code blocks and another method or scheme to a second subset ($M_2$) of a set of code blocks, where M=$M_1$+$M_2$. In such cases, the UE may form a first subset of code block groups ($N_1$) and a second subset of code block groups ($N_2$), where N=$N_1$+$N_2$.

As an example, a UE may receive 15 code blocks (i.e., M=15) to be grouped into 10 code block groups (i.e., N=10). In such cases, the UE may apply one method to nine (9) of the 15 code blocks (i.e., $M_1$=9), grouping the nine (9) code blocks into six (6) code block groups (i.e., $N_1$=6). The UE may then apply another method to six (6) code blocks (i.e., $M_2$=6), grouping the six (6) code blocks into four (4) code block groups ($N_2$=4). Using these techniques, the resulting code block groups may be as follows: {1, 2, 3}, {4, 5, 6}, {7, 8, 9}, {1, 4, 7}, {2, 5, 8}, {3, 6, 9}, {10, 11, 12}, {10, 13, 14}, {11, 13, 15}, {12, 14, 15}.

Additionally, although the methods and schemes are described herein for grouping code blocks into code block groups, the above methods may also apply to a hierarchical grouping where code block groups (e.g., inner groups) are further grouped into code block groups (e.g., outer groups). In such cases, a UE may report ACK/NACK feedback for the outer groups, and the base station may determine whether or not to retransmit code blocks of certain inner groups based on the feedback. As an example, a UE may group 18 code blocks into nine (9) groups of two (2) code blocks each, and the UE may then group the nine (9) code block groups into six (6) outer groups using one of the methods for grouping described herein.

As discussed herein, a UE may select a technique or method for grouping code blocks for feedback reporting or may receive an indication of a technique or method to use for grouping code blocks for feedback reporting based on the probability that the code blocks may be successfully decoded. The following table provides an indication of an expected number of retransmissions of code blocks for different methods of grouping code blocks given a number of code blocks (M), a number of code block groups to be formed (N), the probability of each code block being decoded successfully (q), and, in some cases, a parameter L.

TABLE 1

Exemplary retransmissions for different methods of grouping code blocks

| Method | Exemplary Number of Retransmissions |
|---|---|
| Non-Overlapping Equal Sized Groups | $M(1 - q^K)$ |
| 2 | $(K + 1)(M - NK)[1 - q^{K+1}] +$ $K[N - (M - NK)][1 - q^K]$ |
| 3 | $M(1 - 2q^L + q^{2L-1})$, where $M = L^2$ and $N = 2L$ |
| 4 | $M(1 - 2q^L + q^{2L-1})$, where $M = (N \text{ choose } R)$ and $L = \frac{MR}{N}$ |

Thus, as noted in Table 1, for 100 code blocks, 20 code block groups, and a 90% probability of decoding each code block, the application of the non-overlapping or second methods of grouping code blocks described above may result in an average number of 40.95 retransmissions, whereas the application of the third method of grouping code blocks described above may result in an average number of 43.77 retransmissions. For 100 code blocks, 20 code block groups, and a 99% probability of decoding each code block, the application of the non-overlapping and second methods described above may result in an average number of 4.90 retransmissions, whereas the application of the third method of grouping code blocks described above may result in an average number of 1.74 transmissions. Thus, a wireless device may be able to determine a probability of decoding each code block of a transmission, and the wireless device may identify a method for grouping code blocks based on this probability. Table 1 is provided for illustrative purposes; other schemes and determinations of grouping schemes may also be employed.

Figure 4:
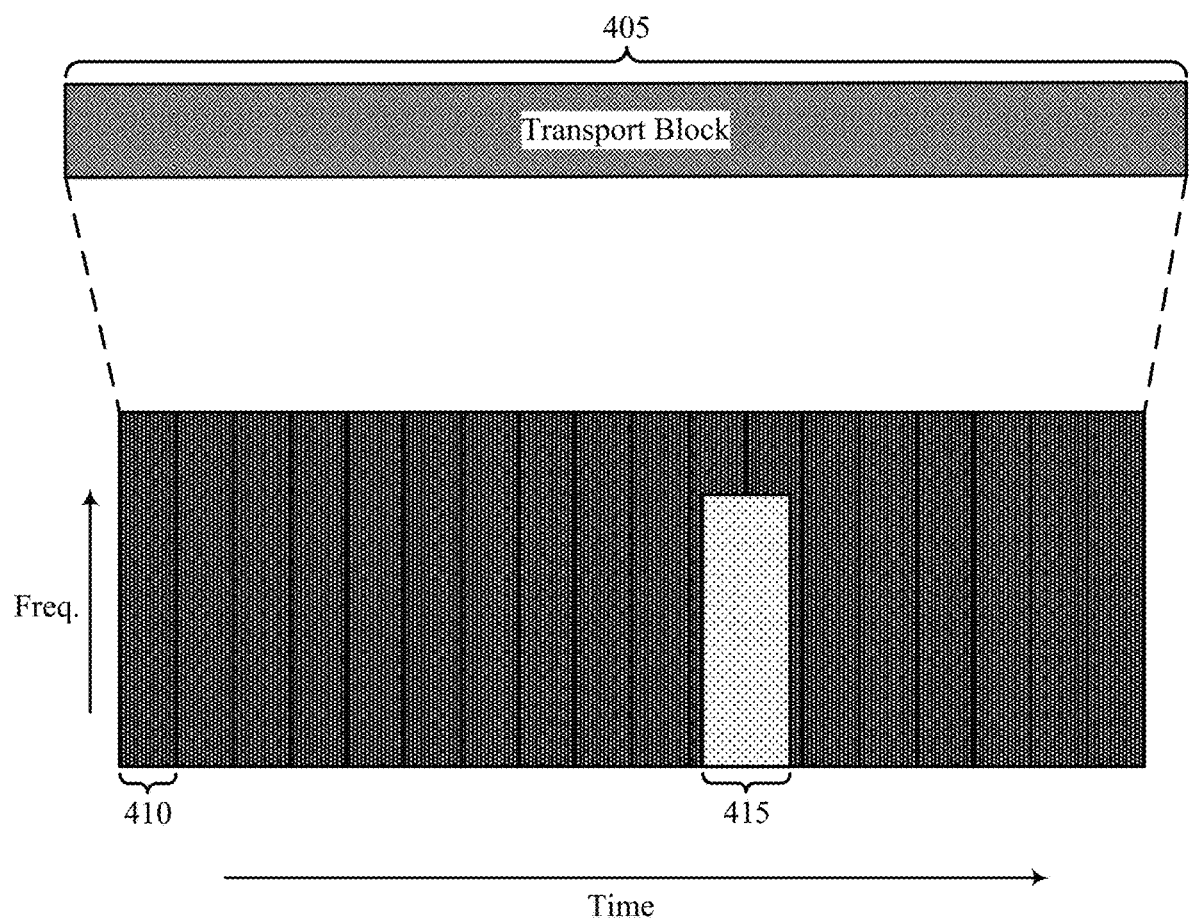
Figure 4:
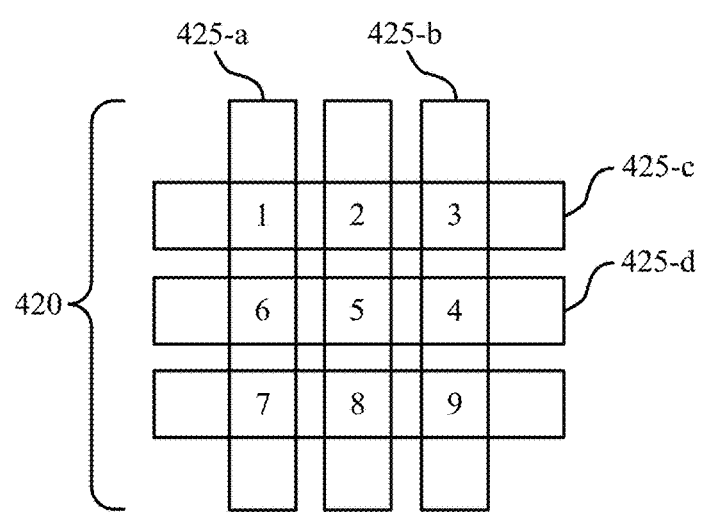

FIG. 4 illustrates an example of a transmission of code blocks 400 in accordance with various aspects of the present disclosure. Although the example of FIG. 4 is described for a downlink transmission, it is to be understood that the techniques described also apply to uplink communication. In some cases, transmission of code blocks 300 may be performed by a base station or a UE, which may be examples of a base station 105 and a UE 115, as described with reference to FIGS. 1 and 2. A base station may transmit data to a UE in the form of a transport block 405 that includes code blocks 410. The UE may receive the code blocks, group the code blocks into code block groups, and transmit an ACK or NACK for each code block group to indicate whether the code blocks in each group were successfully decoded.

In some cases, the code blocks 410 transmitted by the base station may be punctured by another type of communications 415 (e.g., low latency communications). In such cases, adjacent code blocks may be punctured (as shown), and the UE may transmit a NACK for the code block groups that include these punctured code blocks. However, if code blocks are grouped inefficiently, the UE may have to transmit additional NACKs, which may result in additional unnecessary retransmissions. Some wireless communications systems may support efficient techniques for grouping code blocks such that adjacent code blocks are included in a same code block group. Specifically, a UE may group code blocks such that each code block received from a base station is grouped with at least one adjacent code block. The adjacent code blocks may be adjacent in the time domain or frequency domain (i.e., code blocks in adjacent time symbols or in adjacent frequency domain sub-bands).

As an example, according to one or more schemes for grouping code blocks described with reference to FIG. 3, a UE may group code blocks according to code block grouping grid 420. In this case, code blocks 6 and 7 may be grouped in a same code block group 425-a, and code blocks 3 and 4 may be grouped in a same code block group 425-b. Accordingly, if code blocks 3 and 4 are punctured by another type of communications, a UE may transmit a NACK for code block groups 425-b, 425-c, and 425-d rather than for code block groups 425-a, 425-b, 425-c, and 425-d. As a result, a base station may be able to uniquely identify the punctured code blocks based on receiving a NACK for these three (3) code block groups. The code blocks of a transmission may be grouped such that the numbering follows the order in which the code blocks were received (e.g., the symbols in which the code blocks were received). As such, the numbering of the code blocks for grouping purposes may be performed after any code block interleaving is performed in a transport block.

Figure 5:
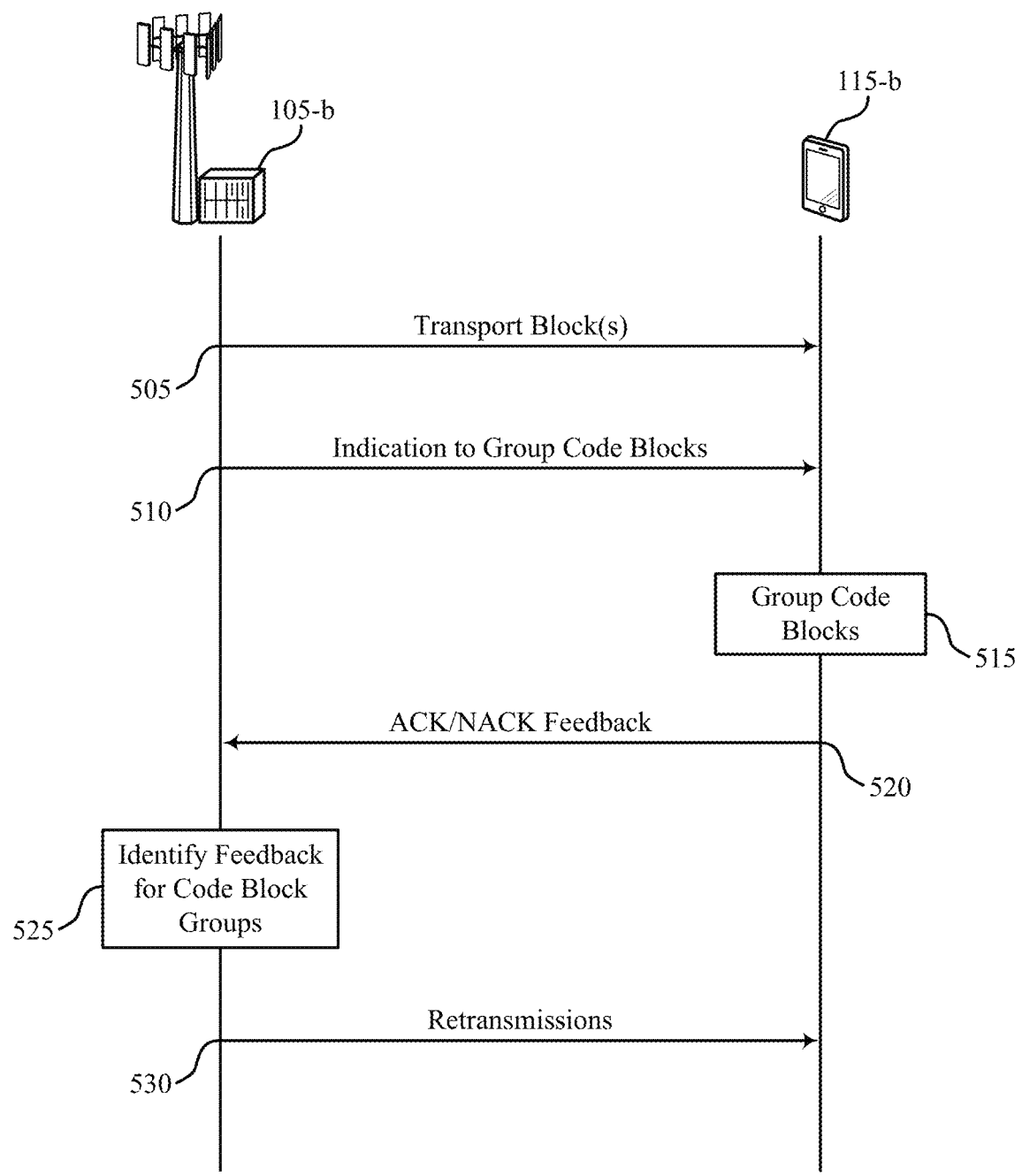
FIGS. 5-6 illustrate examples of process flows that support code block grouping and feedback that support efficient retransmissions in accordance with various aspects of the present disclosure.

FIG. 5 illustrates an example of a process flow 500 that supports code block grouping methods that support efficient retransmissions in accordance with various aspects of the present disclosure. Process flow 500 illustrates aspects of techniques performed by a base station 105-b, which may be an example of a base station 105 as described with reference to FIGS. 1, 2, and 6. Process flow 500 also illustrates aspects of techniques performed by a UE 115-b, which may be an example of a UE 115 as described with reference to FIGS. 1, 2, and 6.

At 505, base station 105-b may transmit one or more transport blocks that include a plurality of code blocks to a UE 115-b. Base station 105-b may then transmit an indication, at 510, to group code blocks of the transmission to UE 115-b. The indication may include an indication of a number of code block groups to be formed. In addition, base station 105-b may indicate a method to use to group code blocks of the transmission for feedback reporting. The indication of the method may be an index to a table, where the index indicates a specific method that UE 115-b should use to group code blocks of the transmission. In other cases, the indication may include information about the transmission (e.g., a service type (e.g., low latency), a target code block decoding error rate, channel conditions, etc.), and UE 115-b may group code blocks of the transmission based on any combination of these parameters. Additionally or alternatively, the indication of the method may be an index to an entry within a table from among several tables, and UE 115-b may select the table to use based on other information about the transmission (e.g., a service type based on a preconfigured mapping).

At 515, UE 115-b may group code blocks of the plurality into code block groups for feedback reporting. For example, UE 115-b may group code blocks of the plurality based on the indication of a number of code block groups to be formed. In some cases, each code block group may include a distinct subset of code blocks of the plurality (e.g., non-overlapping code block groups). In a first example, the code blocks may be grouped evenly such that each code block group includes a same number of code blocks. In a second example, UE 115-b may group a first set of the code blocks into a plurality of code block groups, where each code block group of the plurality include a same number of code blocks, and UE 115-b may then distribute a remaining set of code blocks to one code block group of the plurality. In another example, UE 115-b may group a first set of code blocks into a first plurality of code block groups of a first size, and UE 115-b may group a second set of code blocks into a second plurality of code block groups of a second size.

In other cases, at least two (2) code block groups may include at least one same code block of the plurality. In another example, UE 115-b may group the plurality of code blocks into a first plurality of code block groups, and UE 115-b may group the plurality of code blocks into a second plurality of code block groups, where each code block group of the second plurality includes a code block from each of the first plurality of code block groups. In a fifth example, UE 115-b may identify combinations of code block groups based on the indication to group the code blocks, where the indication to group the code blocks indicates a number of code block groups to be formed, and UE 115-b may distribute each code block of the plurality of code blocks to a different combination of code block groups. In some examples, adjacent sets of two or more code blocks may be within a same code block group. In addition, a code block group may include multiple code block groups.

At 520, UE 115-b may transmit ACK/NACK feedback for each group of code blocks. An ACK may indicate that code blocks within a code block group were successfully decoded, and a NACK may indicate that at least one code block in a code block group was not successfully decoded.

At 525, base station 105-b may identify the grouping of code blocks and determine a mapping between the ACK/NACK feedback and the identified code block groups. Base station 105-b may evaluate the ACK/NACK feedback for each code block group and determine which code blocks to retransmit based on the feedback. As an example, the code blocks within any code block group for which an ACK was received may be excluded for retransmission, and any remaining code blocks that are not excluded may be selected for retransmission. At 530, base station 105-b may retransmit code blocks originally transmitted at 505 based on evaluating the ACK/NACK feedback at 525.

Figure 6:
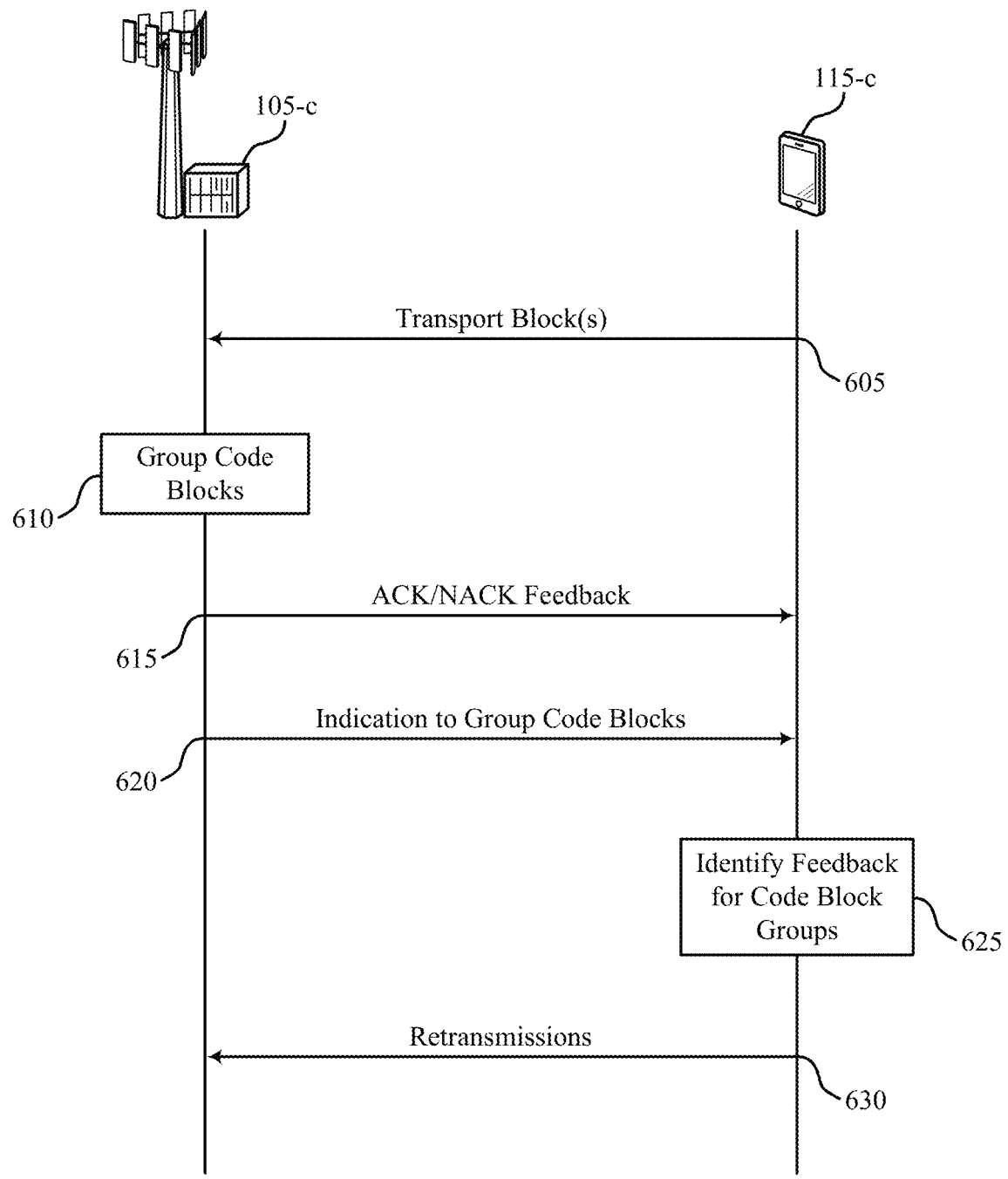

FIG. 6 illustrates an example of a process flow 600 that supports code block grouping methods that support efficient retransmissions in accordance with various aspects of the present disclosure. Process flow 600 illustrates aspects of techniques performed by a base station 105-c, which may be an example of a base station 105 described with reference to FIGS. 1, 2, and 5. Process flow 600 also illustrates aspects of techniques performed by a UE 115-c, which may be an example of a UE 115 described with reference to FIGS. 1, 2, and 5.

At 605, UE 115-c may transmit one or more transport blocks that include a plurality of code blocks to a base station 105-c. At 610, base station 105-c may group code blocks received at 605 for feedback reporting. In some cases, each code block group may include a distinct subset of code blocks of the plurality (e.g., non-overlapping code block groups). In a first example, the code blocks may be grouped evenly such that each code block group includes a same number of code blocks. In another example, base station 105-c may group a first set of the code blocks into a plurality of code block groups, where each code block group of the plurality include a same number of code blocks, and base station 105-c may then distribute a remaining set of code blocks to one code block group of the plurality. In another example, base station 105-c may group a first set of code blocks into a first plurality of code block groups of a first size, and base station 105-c may group a second set of code blocks into a second plurality of code block groups of a second size.

In other cases, at least two (2) code block groups may include at least one same code block of the plurality (e.g., overlapping code block groups). In another example, base station 105-c may group the plurality of code blocks into a first plurality of code block groups, and base station 105-c may group the plurality of code blocks into a second plurality of code block groups, where each code block group of the second plurality includes a code block from each of the first plurality of code block groups. In a fifth example, base station 105-c may identify combinations of code block groups based on a number of code block groups to be formed, and base station 105-c may distribute each code block of the plurality of code blocks to a different combination of code block groups. In some examples, adjacent sets of two or more code blocks may be within a same code block group. In addition, a code block group may include multiple code block groups.

At 615, base station 105-c may transmit ACK/NACK feedback for each group of code blocks formed at 610. Base station 105-c may then transmit, at 620, an indication that code blocks were grouped for feedback reporting to UE 115-c. The indication may include an indication of a number of code block groups that was formed. In addition, base station 105-c may indicate a method that was used to group the code blocks of the transmission for feedback reporting. The indication of the method may be an index to a table, where the index indicates a specific method that base station 105-c used to group code blocks of the transmission. In other cases, the indication may include information about the transmission (e.g., a service type (e.g., low latency), a target code block decoding error rate, channel conditions, etc.), and UE 115-c may identify a method used to group code blocks for feedback reporting based on any one or any combination of these parameters.

Once UE 115-c is able to identify a method used to group code blocks of the transmission, UE 115-c may determine a mapping between the ACK/NACK feedback received at 615 and the identified code block groups. An ACK may indicate that code blocks within a code block group were successfully decoded, and a NACK may indicate that at least one code block in a code block group was not successfully decoded.

At 625, UE 115-c may then evaluate the ACK/NACK feedback to determine which code blocks to retransmit. As an example, the code blocks within any code block group for which an ACK was received may be excluded for retransmission, and any remaining code blocks that are not excluded may be selected for retransmission. At 630, UE 115-c may then retransmit code blocks originally transmitted at 605 based on evaluating the ACK/NACK feedback at 625.

Figure 7:
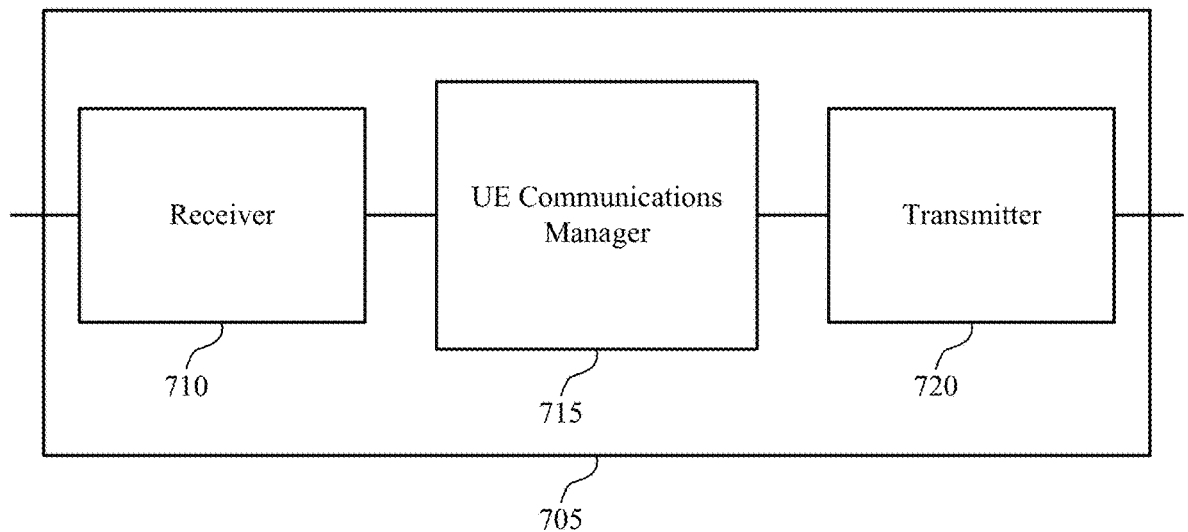
FIGS. 7-9 show block diagrams of a device or devices that support code block grouping and feedback that support efficient retransmissions in accordance with various aspects of the present disclosure.

FIG. 7 shows a block diagram 700 of a wireless device 705 that supports code block grouping methods that support efficient retransmissions in accordance with various aspects of the present disclosure. Wireless device 705 may be an example of aspects of a UE 115 as described with reference to FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to code block grouping methods that support efficient retransmissions, etc.). Information may be passed on to other components of the device. The receiver 710 may be an example of aspects of the transceiver 1035 described with reference to FIG. 10. The receiver 710 may utilize a single antenna or a set of antennas. In some cases, receiver 710 may receive one or more transport blocks that include a plurality of code blocks.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive an indication to group code blocks of the set (e.g., the set of code blocks received by receiver 710) for feedback reporting and transmit an acknowledgement or negative-acknowledgement for each code block group based on the indication. In some examples, a first set of code blocks of the plurality (multiple) of code blocks may be grouped into one or more code block groups of a first size, and a second set of code blocks of the plurality of code blocks may be grouped into one or more code block groups of a second size. In some aspects, one or more code blocks of the plurality of code blocks may be grouped into two or more code block groups of a plurality of code block groups (i.e., at least two or more code block groups of the plurality of code groups share a common code block).

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
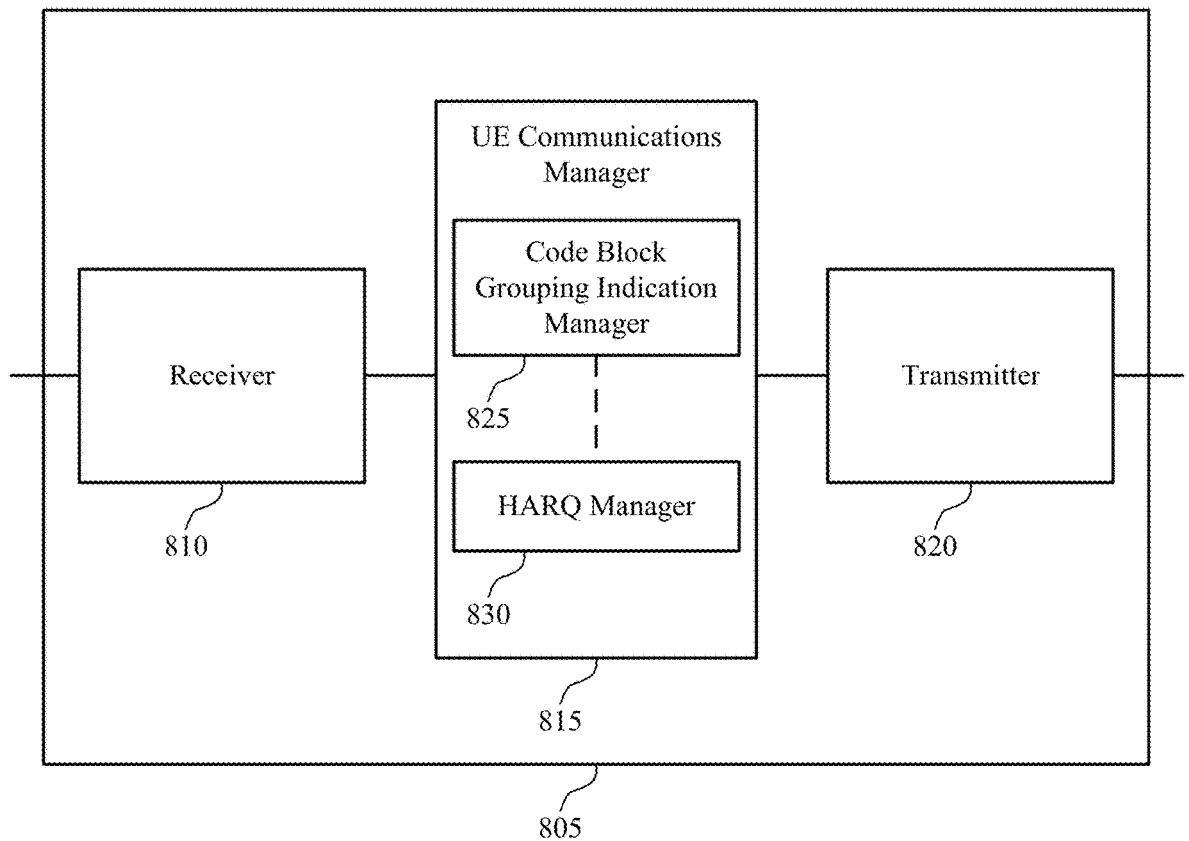

FIG. 8 shows a block diagram 800 of a wireless device 805 that supports code block grouping methods that support efficient retransmissions in accordance with various aspects of the present disclosure. Wireless device 805 may be an example of aspects of a wireless device 705 or a UE 115 as described with reference to FIGS. 1 and 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to code block grouping methods that support efficient retransmissions, etc.). Information may be passed on to other components of the device. The receiver 810 may be an example of aspects of the transceiver 1035 described with reference to FIG. 10. The receiver 810 may utilize a single antenna or a set of antennas. In some cases, receiver 810 may receive one or more transport blocks that include a plurality of code blocks.

UE communications manager 815 may be an example of aspects of the UE communications manager 1015 described with reference to FIG. 10. UE communications manager 815 may include code block grouping indication manager 825 and HARQ manager 830. Code block grouping indication manager 825 may receive an indication to group code blocks of the plurality of code blocks for feedback reporting and receive an indication of a number of code block groups to be formed. In some cases, code blocks of the plurality of code blocks are grouped based at least in part on the indication of the number of the number of code block groups to be formed. In some cases, code block grouping indication manager 825 may receive an indication to group code blocks of the plurality of code blocks for feedback reporting, where at least one of the code blocks of the plurality of code blocks is included in two or more code block groups of a plurality of code block groups. Further, the plurality of code blocks may be grouped into a first plurality of code block groups, and a second plurality of code block groups, where each code block group of the second plurality of code block groups comprises a code block from each of the first plurality of code block groups.

HARQ manager 830 may transmit an acknowledgement or negative-acknowledgement for each code block group based on the indication. In some cases, the acknowledgement indicates that code blocks within a code block group were successfully decoded, and the negative-acknowledgement indicates that at least one code block in a code block group was not successfully decoded.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
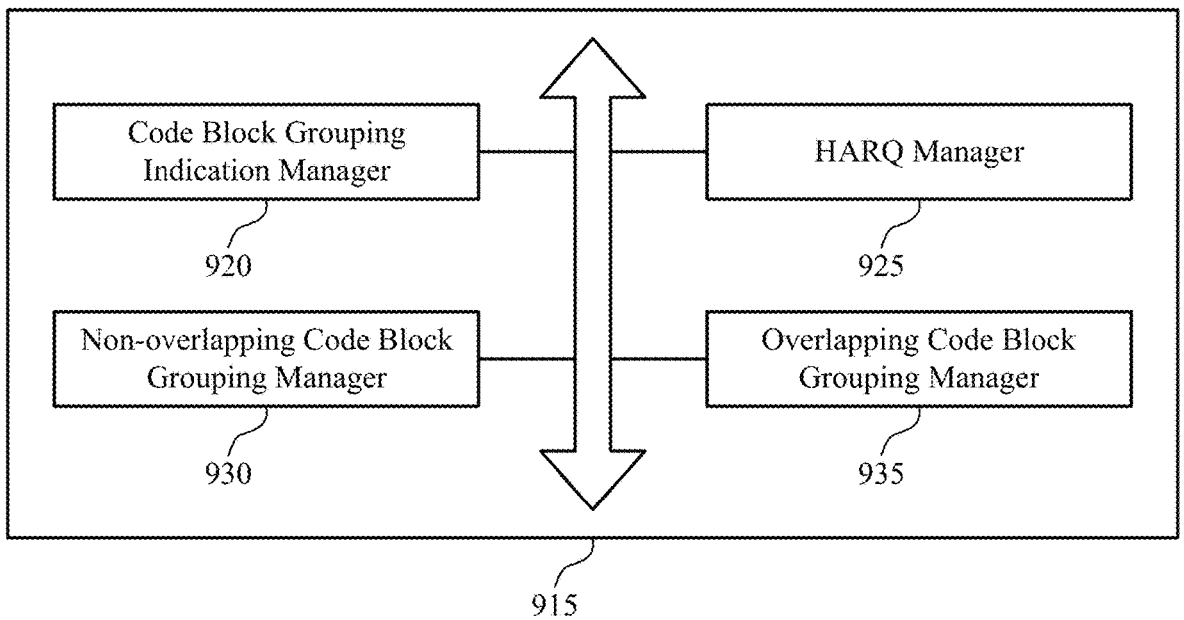

FIG. 9 shows a block diagram 900 of a UE communications manager 915 that supports code block grouping methods that support efficient retransmissions in accordance with various aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include code block grouping indication manager 920, HARQ manager 925, non-overlapping code block grouping manager 930, and overlapping code block grouping manager 935. Each of these modules may communicate, directly or indirectly, with one another (e.g., via one or more buses).

Code block grouping indication manager 920 may receive an indication to group code blocks of the set for feedback reporting and receive an indication of a number of code block groups to be formed. HARQ manager 925 may transmit an acknowledgement or negative-acknowledgement for each code block group based on the indication. In some cases, code blocks of the plurality of code blocks are grouped based at least in part on the indication of the number of code block groups to be formed. In some cases, the acknowledgement indicates that code blocks within a code block group were successfully decoded. In some cases, the negative-acknowledgement indicates that at least one code block in a code block group was not successfully decoded.

Non-overlapping code block grouping manager 930 may identify that each code block group includes a distinct subset of code blocks of the plurality of code blocks based at least in part on the indication. In some cases, each code block group includes a same number of code blocks. In some cases, each code block group of the one or more code block groups of the first size includes a same number of code blocks, and the second set of code blocks includes a remaining set of code blocks that are distributed to one code block group of the second size. In some cases, the one or more code block groups of the first size include a first set of code block groups of the first size and the one or more code block groups of the second size include a second plurality of code block groups of the second size.

Overlapping code block grouping manager 935 may identify that the indication assigns at least one code block of the plurality of code blocks to two or more code block groups of a plurality of code block groups. In some cases, the set of code blocks may be grouped into a first set of code block groups, and the set of code blocks may be grouped into a second set of code block groups, where each code block group of the second set includes a code block from each of the first set of code block groups. In some cases, each code block of the plurality of code blocks is distributed to a different combination of code block groups. In some cases, at least one of the code blocks of the plurality of code blocks is included in two or more code block groups of a plurality of code block groups.

In some cases, code blocks of the set may be grouped based on an indication of the number of code block groups to be formed. In some cases, non-overlapping code block grouping manager 930 and overlapping code block grouping manager 935 may identify a grouping of the code blocks of the plurality of code blocks based at least in part on a type of service associated with the one or more transport blocks, an MCS used to transmit the one or more transport blocks, or the like. In some cases, adjacent sets of two or more code blocks of the plurality of code blocks may be grouped within a same code block group. In some cases, the adjacent sets of two or more code blocks of the plurality of code blocks are adjacent in a time domain or a frequency domain. In some cases, a code block group includes multiple code block groups.

Figure 10:
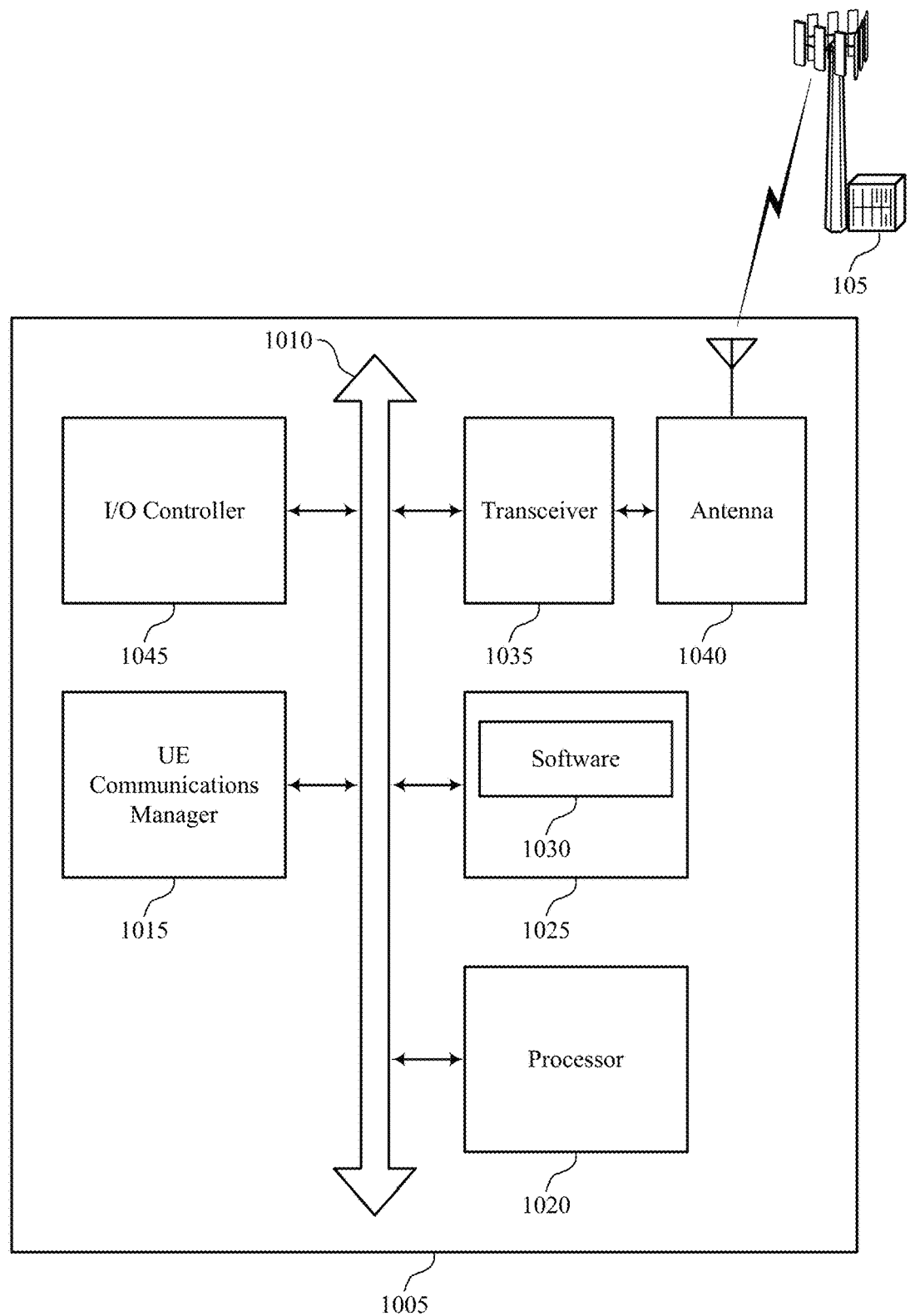
FIG. 10 illustrates a block diagram of a system including a device, such as a user equipment, that supports code block grouping and feedback that support efficient retransmissions in accordance with various aspects of the present disclosure.

FIG. 10 shows a diagram of a system 1000 including a device 1005 that supports code block grouping methods that support efficient retransmissions in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting code block grouping methods that support efficient retransmissions).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support code block grouping methods that support efficient retransmissions. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
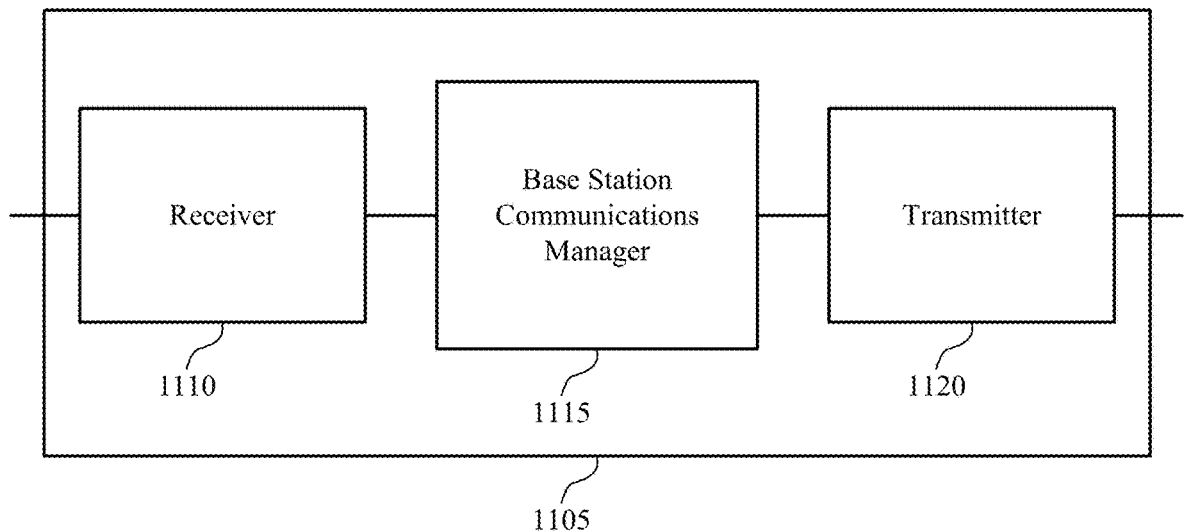
FIGS. 11-13 show block diagrams of a device or devices that support code block grouping and feedback that support efficient retransmissions in accordance with various aspects of the present disclosure.

FIG. 11 shows a block diagram 1100 of a wireless device 1105 that supports code block grouping methods that support efficient retransmissions in accordance with various aspects of the present disclosure. Wireless device 1105 may be an example of aspects of a base station 105 as described with reference to FIG. 1. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to code block grouping methods that support efficient retransmissions, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit an indication to group code blocks of a plurality of code blocks (e.g., a plurality of code blocks transmitted by transmitter 1120) for feedback reporting and receive an acknowledgement or negative-acknowledgement for each code block group based on the indication. In some cases, a first set of code blocks of the plurality of code blocks may be grouped into one or more code block groups of a first size, and a second set of code blocks of the plurality of code blocks may be grouped into one or more code block groups of a second size. In some cases, at least one of the code blocks of the plurality of code blocks is included in two or more code block groups of a plurality of code block groups. In some other cases, one or more code blocks of the plurality of code blocks are grouped into two or more code block groups of a plurality of code block groups.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas. As mentioned above, transmitter 1120 may transmit one or more transport blocks that include a plurality of code blocks.

Figure 12:
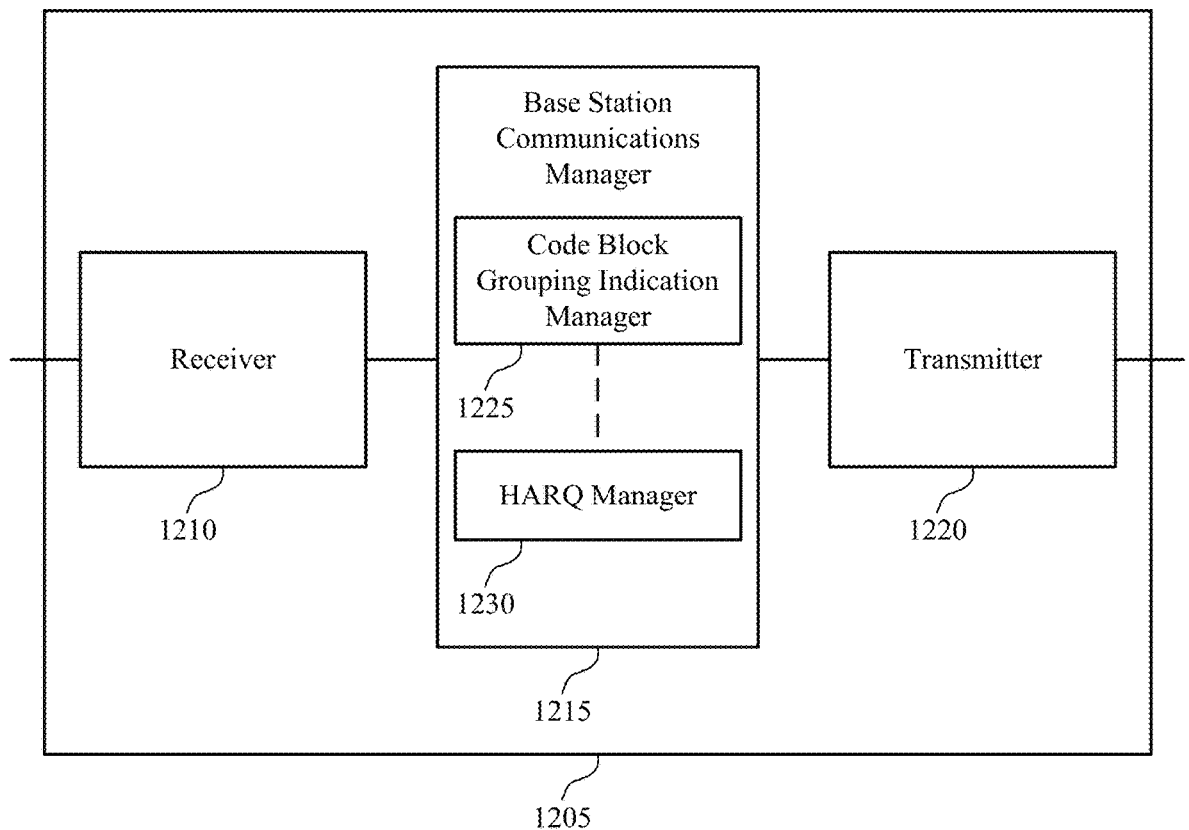

FIG. 12 shows a block diagram 1200 of a wireless device 1205 that supports code block grouping methods that support efficient retransmissions in accordance with various aspects of the present disclosure. Wireless device 1205 may be an example of aspects of a wireless device 1105 or a base station 105 as described with reference to FIGS. 1 and 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to code block grouping methods that support efficient retransmissions, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may include code block grouping indication manager 1225 and HARQ manager 1230. Code block grouping indication manager 1225 may transmit an indication to group code blocks of the plurality of code blocks (e.g., a plurality of code blocks transmitted by transmitter 1220) for feedback reporting and transmit an indication of a number of code block groups to be formed, where code blocks of the plurality of code blocks are grouped based on the indication of the number of code blocks to be formed. In some cases, code block grouping indication manager 1225 may transmit an indication to group code blocks of the plurality of code blocks for feedback reporting, where at least one of the code blocks of the plurality of code blocks is included in two or more code block groups of a plurality of code block groups. Further, the plurality of code blocks may be grouped into a first plurality of code block groups, and a second plurality of code block groups, where each code block group of the second plurality of code block groups comprises a code block from each of the first plurality of code block groups.

HARQ manager 1230 may receive an acknowledgement or negative-acknowledgement for each code block group based on the indication. In some cases, the acknowledgement indicates that code blocks within a code block group were successfully decoded, and the negative-acknowledgement indicates that at least one code block in a code block group was not successfully decoded. In some cases, HARQ manager 1230 may determine one or more code blocks for retransmission based on the indication and the received acknowledgement or negative-acknowledgement for each code block group.

HARQ manager 1230 may then coordinate with transmitter 1220 to retransmit the one or more code blocks based on the determination. Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
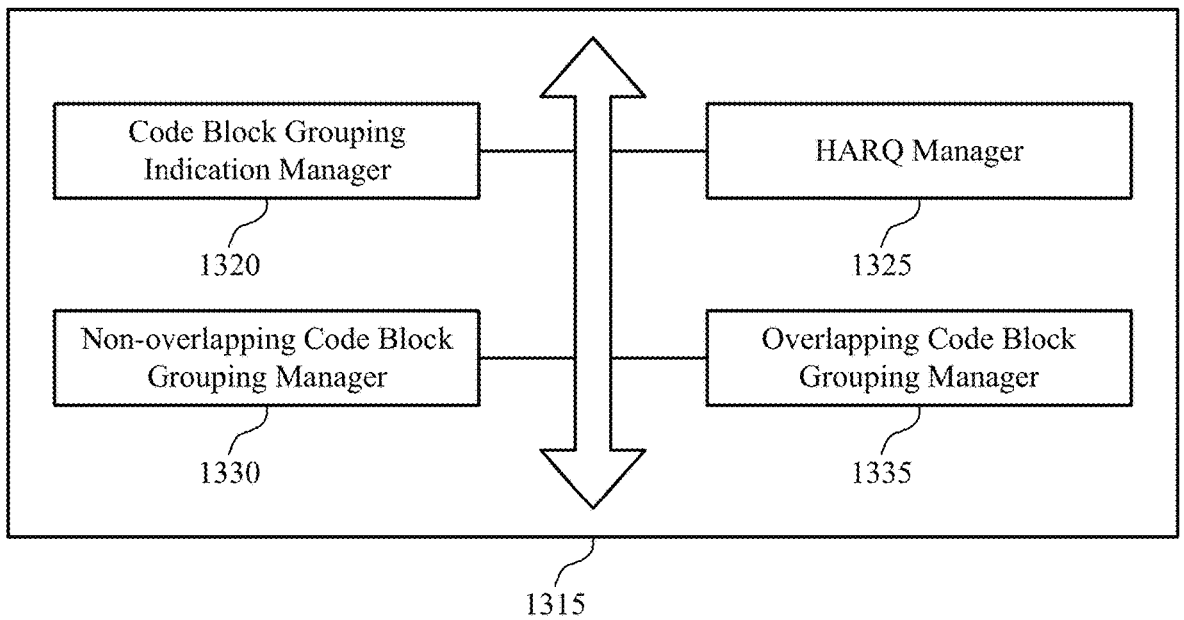

FIG. 13 shows a block diagram 1300 of a base station communications manager 1315 that supports code block grouping methods that support efficient retransmissions in accordance with various aspects of the present disclosure. The base station communications manager 1315 may be an example of aspects of a base station communications manager 1415 described with reference to FIGS. 11, 12, and 14. The base station communications manager 1315 may include code block grouping indication manager 1320, HARQ manager 1325, non-overlapping code block grouping manager 1330, and overlapping code block grouping manager 1335. Each of these modules may communicate, directly or indirectly, with one another (e.g., via one or more buses).

Code block grouping indication manager 1320 may transmit an indication to group code blocks of a set of code blocks for feedback reporting and transmit an indication of a number of code block groups to be formed, where code blocks of the plurality of code blocks are grouped based on the indication of the number of code blocks to be formed. In some cases, the one or more code blocks of the plurality of code blocks are grouped into two or more code block groups of a plurality of code block groups. In some cases, at least one of the code blocks of the plurality of code blocks is included in two or more code block groups of a plurality of code block groups. In some other cases, a first set of code blocks of the plurality of code blocks are grouped into one or more code block groups of a first size, and a second set of code blocks of the plurality of code blocks are grouped into one or more code block groups of a second size.

HARQ manager 1325 may receive an acknowledgement or negative-acknowledgement for each code block group based on the indication. In some cases, the acknowledgement indicates that code blocks within a code block group were successfully decoded, and the negative-acknowledgement indicates that at least one code block in a code block group was not successfully decoded. In some cases, HARQ manager 1325 may determine one or more code blocks for retransmission based on the indication and the received acknowledgement or negative-acknowledgement for each code block group. HARQ manager 1325 may then coordinate with a transmitter to retransmit the one or more code blocks based on the determination.

Non-overlapping code block grouping manager 1330 may identify code block groups that include a distinct subset of code blocks of the set. In some cases, each code block group includes a same number of code blocks. In some cases, a first set of code blocks are grouped into a set of code block groups, where each code block group of the set includes a same number of code blocks, and a remaining set of code blocks are distributed to one code block group of the set. In some cases, each code block group of the one or more code block groups of the first size includes a same number of code blocks, and the second set of code blocks includes a remaining set of code blocks that are distributed to one code block group of the second size. In some other cases, the one or more code block groups of the first size include a first plurality of code block groups of the first size, and the one or more code block groups of the second size include a second plurality of code block groups of the second size.

Overlapping code block grouping manager 1335 may identify that the indication assigns at least one code block of the plurality of code blocks to two or more code block groups of a plurality of code block groups. In some cases, the plurality of code blocks are grouped into a first plurality of code block groups, and the plurality of code blocks are grouped into a second plurality of code block groups, where each code block group of the second plurality of code block groups includes a code block from each of the first plurality of code block groups. In some cases, each code block of the plurality of code blocks is distributed to a different combination of code block groups. In some cases, a code block group includes multiple code block groups. In some cases, adjacent sets of two or more code blocks of the set of code blocks may be grouped within a same code block group. In some cases, the adjacent sets of two or more code blocks of the plurality of code blocks are adjacent in a time domain or a frequency domain.

Non-overlapping code block grouping manager 1330 and overlapping code block grouping manager 1335 may identify a grouping of the code blocks of the plurality based on a type of service associated with the one or more transport blocks, an MCS used to transmit the one or more transport blocks, or the like.

Figure 14:
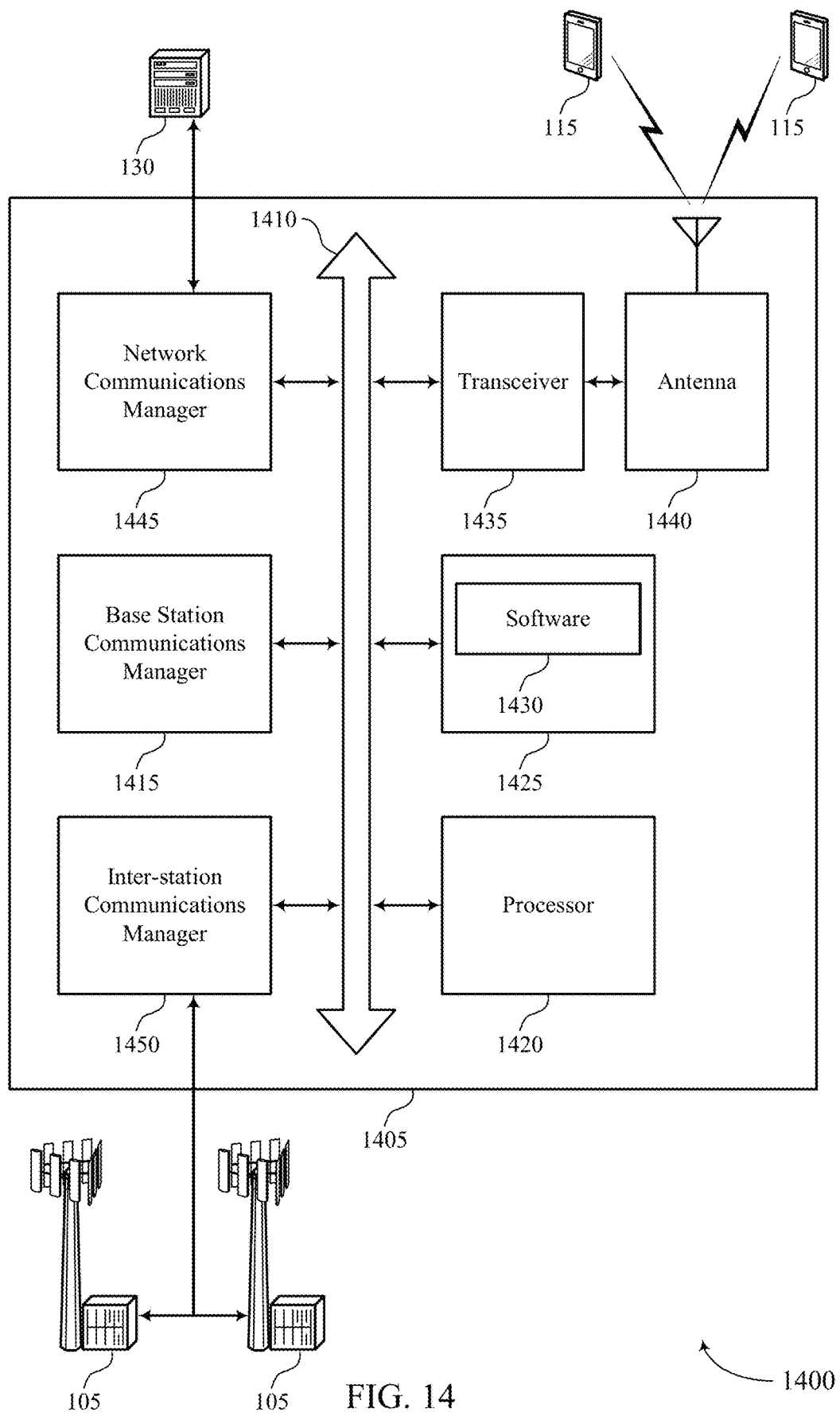
FIG. 14 illustrates a block diagram of a system including a device, such as a base station, that supports code block grouping and feedback that support efficient retransmissions in accordance with various aspects of the present disclosure.

FIG. 14 shows a diagram of a system 1400 including a device 1405 that supports code block grouping methods that support efficient retransmissions in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting code block grouping methods that support efficient retransmissions).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support code block grouping methods that support efficient retransmissions. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
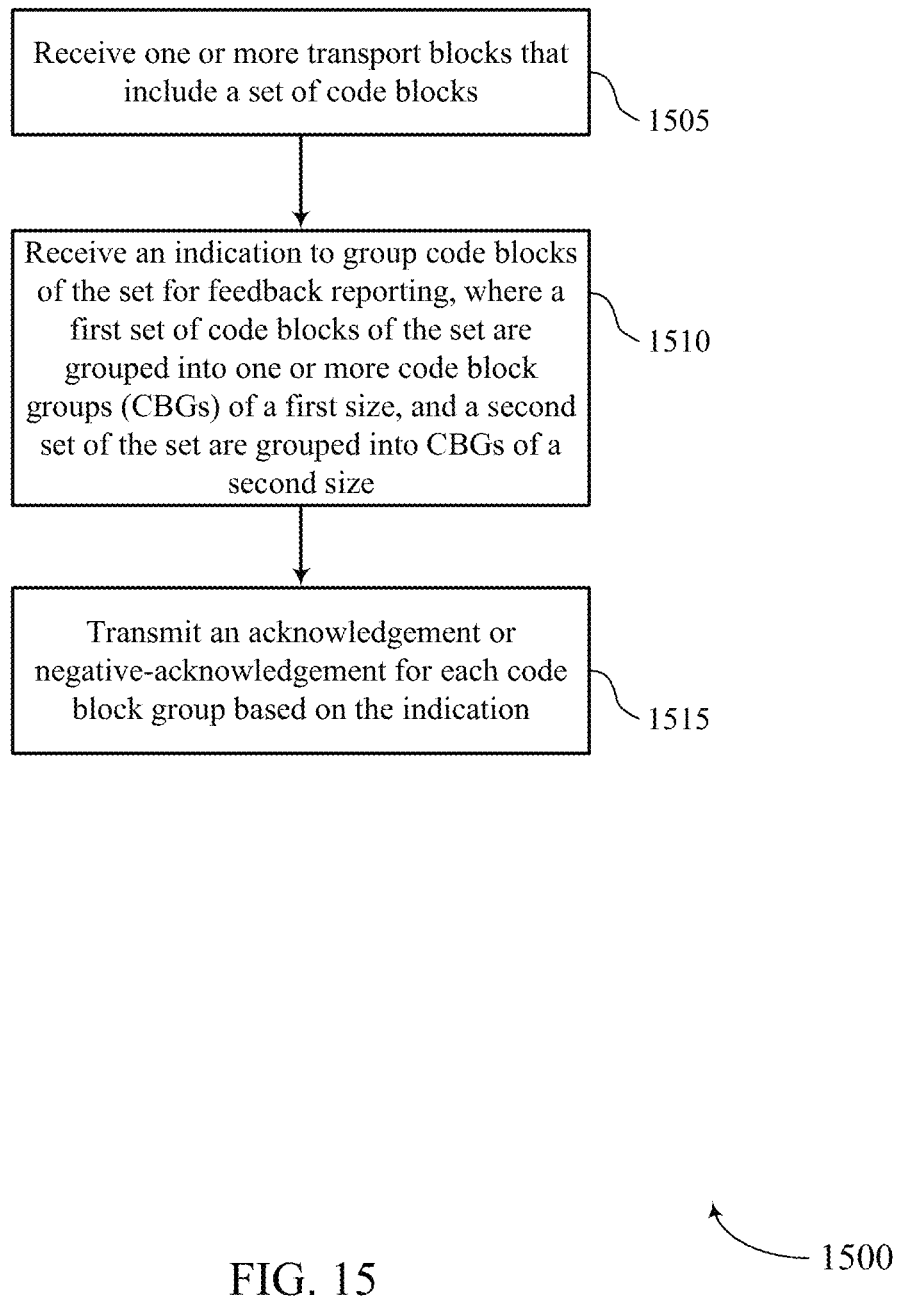
FIGS. 15-18 illustrate methods for code block grouping methods that support efficient retransmissions in accordance with various aspects of the present disclosure.

FIG. 15 shows a flowchart illustrating a method 1500 for code block grouping methods that support efficient retransmissions in accordance with various aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may receive one or more transport blocks that include a set (e.g., a plurality) of code blocks. The operations of block 1505 may be performed according to the methods described with reference to FIGS. 1 through 6. In certain examples, aspects of the operations of block 1505 may be performed by a receiver as described with reference to FIGS. 7 through 10.

At 1510, the UE 115 may receive an indication to group code blocks of the set of code blocks for feedback reporting, where a first set of code blocks of the set of code blocks are grouped into one or more code block groups of a first size, and second set of the set of code blocks are grouped into code block groups of a second size. In some cases, the UE 115 may further identify that each code block group includes a distinct subset of code blocks of the set of code blocks, based in part on the indication received. Further, each code block group may include the same number of code blocks. The operations of block 1510 may be performed according to the methods described with reference to FIGS. 1 through 6. In certain examples, aspects of the operations of block 1510 may be performed by a code block grouping indication manager as described with reference to FIGS. 7 through 10.

At 1515, the UE 115 may transmit an acknowledgement or negative-acknowledgement for each code block group based at least in part on the indication. In some aspects, the acknowledgment and negative-acknowledgment may indicate if one or more code blocks within a code block group were successfully or not successfully decoded. For instance, the UE 115 may transmit a negative acknowledgment if at least one code block in a code block group was not successfully decoded. The operations of block 1515 may be performed according to the methods described with reference to FIGS. 1 through 6. In certain examples, aspects of the operations of block 1515 may be performed by a HARQ manager as described with reference to FIGS. 7 through 10.

Figure 16:
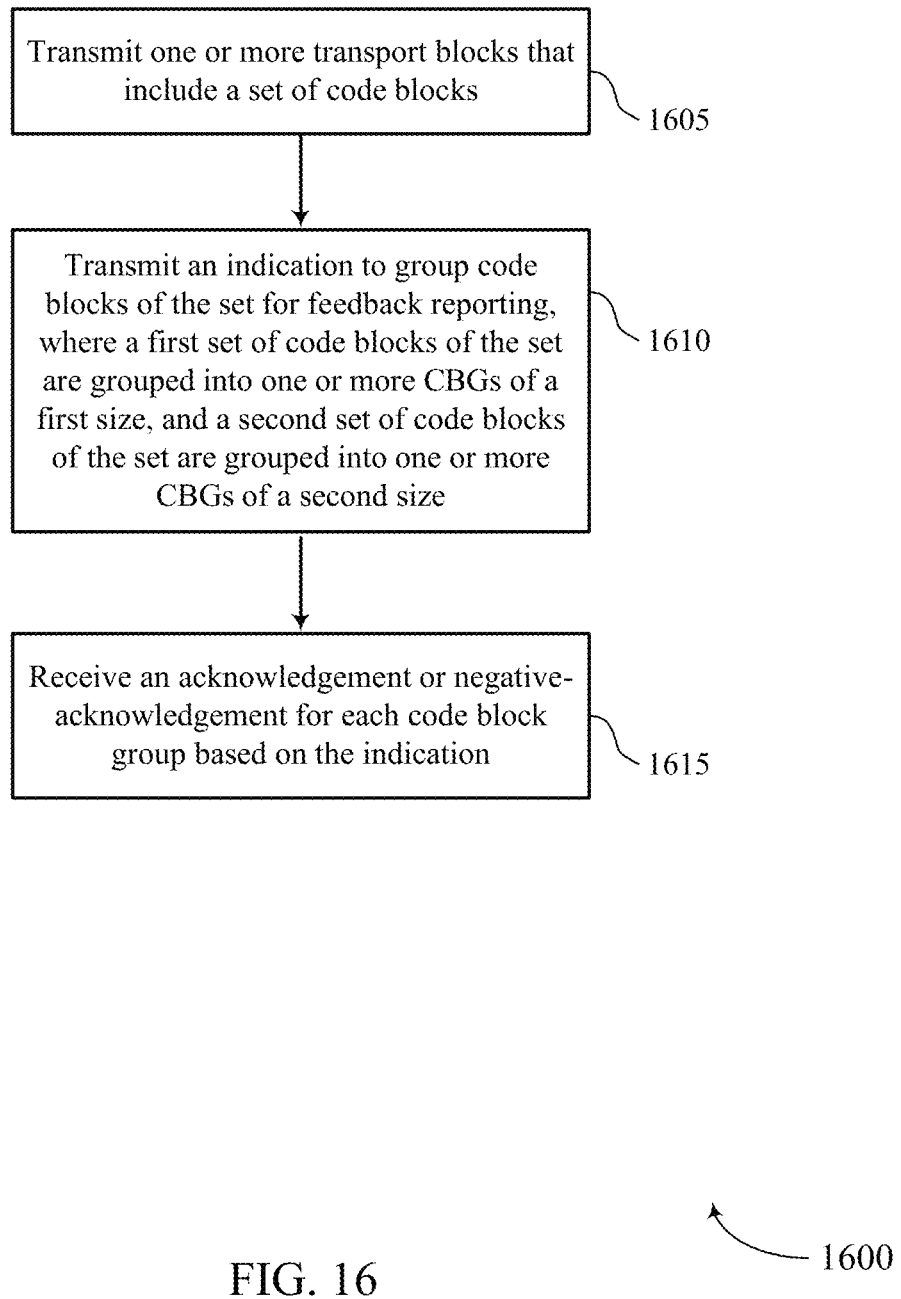

FIG. 16 shows a flowchart illustrating a method 1600 for code block grouping methods that support efficient retransmissions in accordance with various aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may transmit one or more transport blocks that include a plurality of code blocks. The operations of block 1605 may be performed according to the methods described with reference to FIGS. 1 through 6. In certain examples, aspects of the operations of block 1605 may be performed by a transmitter as described with reference to FIGS. 11 through 14.

At 1610, the base station 105 may transmit an indication to group code blocks of the plurality for feedback reporting. In some cases, a first set of code blocks of the plurality of code blocks may be grouped into one or more code block groups of a first size, and a second set of code blocks of the plurality of code blocks may be grouped into one or more code block groups of a second size. In some other cases, at least one of the code blocks of the plurality of code blocks may be included in two or more code block groups of a plurality of code block groups. In some cases, at least one of the code blocks of the plurality of code blocks is included in two or more code block groups of a plurality of code block groups. The operations of block 1610 may be performed according to the methods described with reference to FIGS. 1 through 6. In certain examples, aspects of the operations of block 1610 may be performed by a code block grouping indication manager as described with reference to FIGS. 11 through 14.

At 1615, the base station 105 may receive an acknowledgement or negative-acknowledgement for each code block group based at least in part on the indication. The operations of block 1615 may be performed according to the methods described with reference to FIGS. 1 through 6. In certain examples, aspects of the operations of block 1615 may be performed by a HARQ manager as described with reference to FIGS. 11 through 14.

Figure 17:
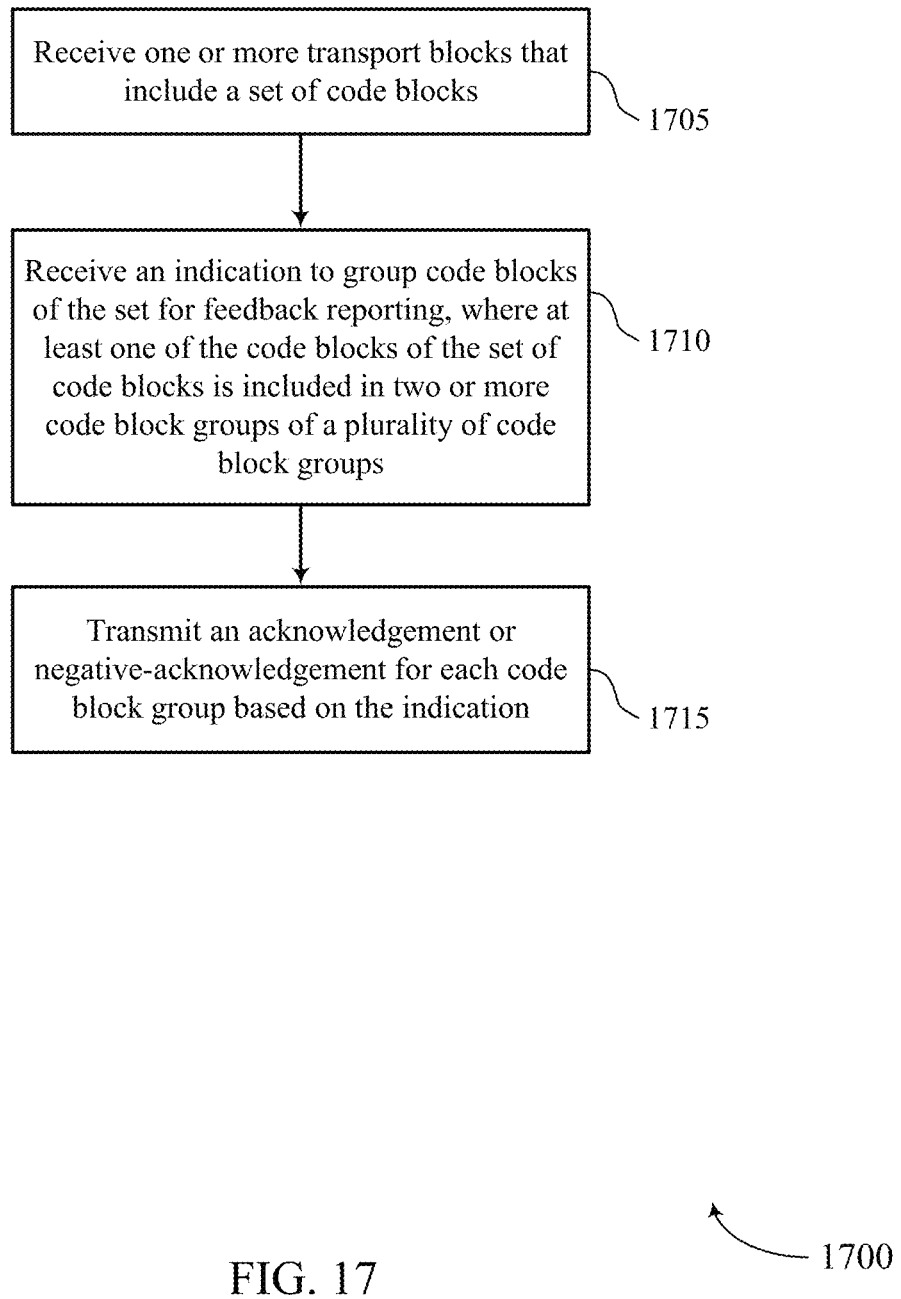

FIG. 17 shows a flowchart illustrating a method 1700 for code block grouping methods that support efficient retransmissions in accordance with various aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705, the UE 115 may receive one or more transport blocks that include a plurality of code blocks. The operations of block 1705 may be performed according to the methods described with reference to FIGS. 1 through 6. In certain examples, aspects of the operations of block 1705 may be performed by a receiver as described with reference to FIGS. 7 through 10.

At 1710, the UE 115 may receive an indication to group code blocks of the plurality for feedback reporting, where at least one of the code blocks of the plurality of code blocks is included in two or more code block groups of a plurality of code block groups. For example, the UE 115 may group code blocks into overlapping code block groups, where at least two code block groups include a common code block, which may be referred to as overlapping code block grouping. In some other cases, the UE 115 may group code blocks into non-overlapping code block groups, where each code block group includes a distinct subset of code blocks. The operations of block 1710 may be performed according to the methods described with reference to FIGS. 1 through 6. In certain examples, aspects of the operations of block 1710 may be performed by a code block grouping indication manager as described with reference to FIGS. 7 through 10.

At 1715, the UE 115 may transmit an acknowledgement (i.e., an indication that code blocks within a code block group were successfully decoded) or negative-acknowledgement (i.e., an indication that at least one code block in a code block group was not successfully decoded) for each code block group based at least in part on the indication. The operations of block 1515 may be performed according to the methods described with reference to FIGS. 1 through 6. In certain examples, aspects of the operations of block 1715 may be performed by a HARQ manager as described with reference to FIGS. 7 through 10.

Figure 18:
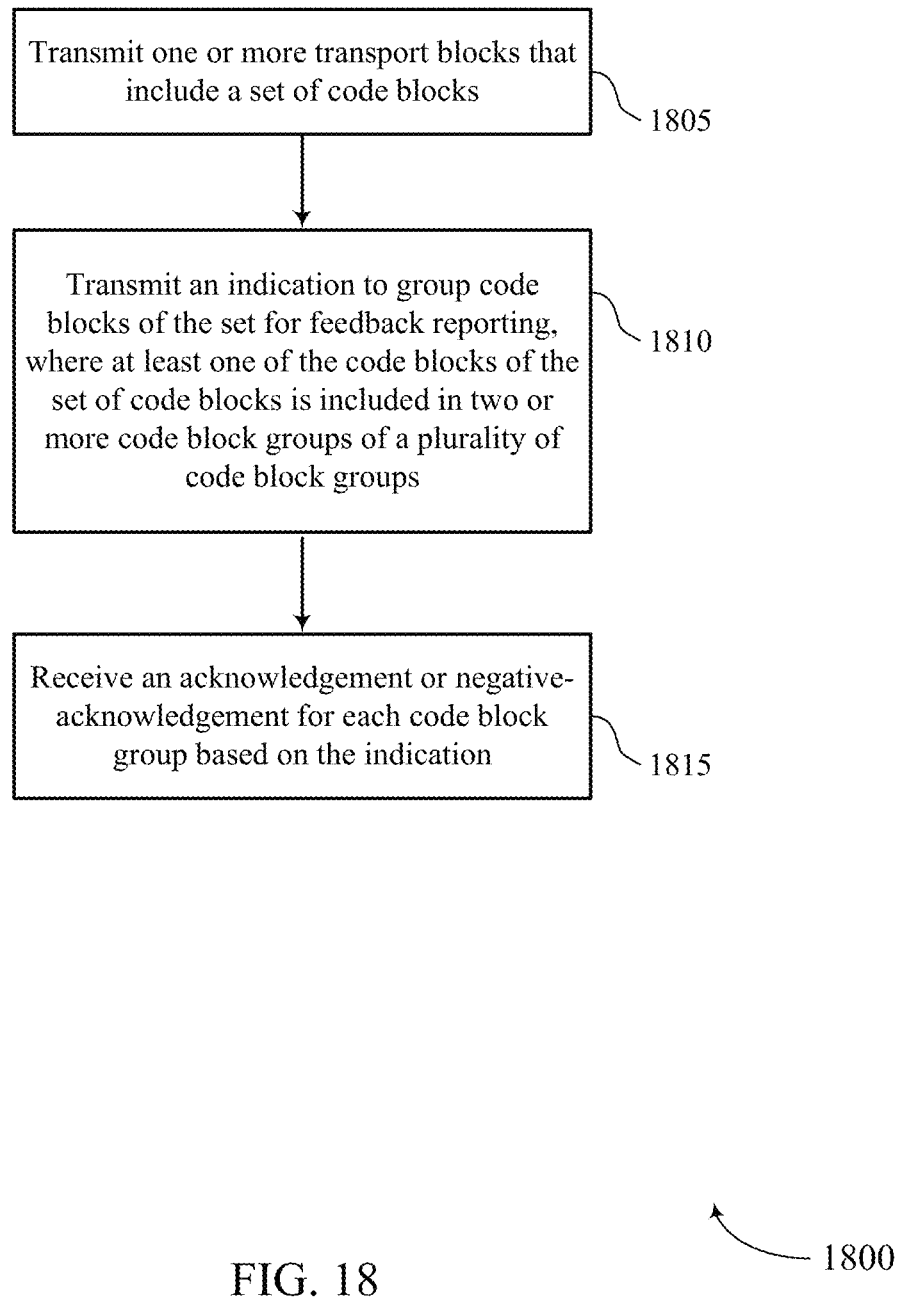

FIG. 18 shows a flowchart illustrating a method 1800 for code block grouping methods that support efficient retransmissions in accordance with various aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may transmit one or more transport blocks that include a plurality of code blocks. The operations of block 1805 may be performed according to the methods described with reference to FIGS. 1 through 6. In certain examples, aspects of the operations of block 1805 may be performed by a transmitter as described with reference to FIGS. 11 through 14.

At 1810, the base station 105 may transmit an indication to group code blocks of the plurality for feedback reporting. In some cases, the base station 105 may transmit an indication of a number of code block groups to be formed, where code blocks of the plurality of code blocks may be grouped based at least in part on the indication of the number of code block groups to be formed. In some cases, one or more code blocks of the plurality of code blocks may be grouped into two or more code block groups of a plurality of code block groups. In some cases, at least one of the code blocks of the plurality of code blocks is included in two or more code block groups of a plurality of code block groups. For instance, the plurality of code blocks may be grouped into a first plurality of code block groups, and the plurality of code blocks may be grouped into a second plurality of code block groups, where each code block group of the second plurality of code block groups includes a code block from each of the first plurality of code block groups (i.e., overlapping code block grouping). The operations of block 1810 may be performed according to the methods described with reference to FIGS. 1 through 6. In certain examples, aspects of the operations of block 1810 may be performed by a code block grouping indication manager as described with reference to FIGS. 11 through 14.

At 1815, the base station 105 may receive an acknowledgement or negative-acknowledgement for each code block group based at least in part on the indication. The operations of block 1815 may be performed according to the methods described with reference to FIGS. 1 through 6. In certain examples, aspects of the operations of block 1815 may be performed by a HARQ manager as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   at least one processor; and
   at least one memory coupled with the at least one processor, with instructions stored in the at least one memory, the instructions being executable by the at least one processor, individually or in any combination, to cause the apparatus to:
   transmit a transport block that comprises a plurality of code blocks;
   transmit an indication to group code blocks of the plurality of code blocks of the transport block for feedback reporting, wherein:
   a first set of code blocks of the plurality of code blocks are grouped into one or more code block groups comprising a first quantity of code blocks,
   the one or more code block groups of the first quantity of code blocks comprise a first plurality of code block groups of the first quantity of code blocks, a second set of code blocks of the plurality of code blocks are grouped into one or more code block groups comprising a second quantity of code blocks, the one or more code block groups of the second quantity of code blocks comprise a second plurality of code block groups of the second quantity of code blocks, the first quantity of code blocks is different from the second quantity of code blocks, each code block group comprises a distinct subset of code blocks of the plurality of code blocks, and each code block group of the one or more code block groups comprising the first quantity of code blocks comprises a same number of code blocks; and receive an acknowledgement or negative-acknowledgement for each code block group based at least in part on the indication.

2. The apparatus of claim 1, wherein:
the acknowledgement indicates that code blocks within a code block group were successfully decoded; and
the negative-acknowledgement indicates that at least one code block in a code block group was not successfully decoded.

3. The apparatus of claim 1, the instructions being executable by the at least one processor, individually or in any combination, to further cause the apparatus to:
transmit an indication of a number of code block groups to be formed, wherein code blocks of the plurality of code blocks are grouped based at least in part on the indication of the number of code block groups to be formed.

4. The apparatus of claim 1, wherein adjacent sets of two or more code blocks of the plurality of code blocks are within a same code block group.

5. The apparatus of claim 4, wherein the adjacent sets of two or more code blocks of the plurality of code blocks are adjacent in a time domain or a frequency domain.

6. The apparatus of claim 1, wherein a code block group comprises multiple code block groups.

7. The apparatus of claim 1, the instructions being executable by the at least one processor, individually or in any combination, to further cause the apparatus to:
identify a grouping of the code blocks of the plurality of code blocks based at least in part on a type of service associated with the transport block, or a modulation and coding scheme (MCS) used to transmit the transport block, or any combination thereof.

8. The apparatus of claim 1, wherein the second set of code blocks comprises a remaining set of code blocks that are distributed to one code block group comprising the second quantity of code blocks.

9. The apparatus of claim 1, wherein at least one of the code blocks of the plurality of code blocks is included in two or more code block groups of the first plurality of code block groups.

10. The apparatus of claim 1, wherein each code block group of the second plurality of code block groups comprises a code block from each of the first plurality of code block groups.

11. The apparatus of claim 1, wherein each code block of the plurality of code blocks is distributed to a different combination of code block groups.

12. The apparatus of claim 1, wherein the indication assigns at least one code block of the plurality of code blocks to the first plurality of code block groups.

13. The apparatus of claim 1, the instructions being executable by the at least one processor, individually or in any combination, to further cause the apparatus to:
determine one or more code blocks for retransmission based at least in part on the indication and the received acknowledgement or negative-acknowledgement for each code block group; and
retransmit the one or more code blocks based at least in part on the determination.

14. A method for wireless communication, comprising:
transmitting a transport block that comprises a plurality of code blocks;
transmitting an indication to group code blocks of the plurality of code blocks of the transport block for feedback reporting, wherein:
a first set of code blocks of the plurality of code blocks are grouped into one or more code block groups comprising a first quantity of code blocks, the one or more code block groups of the first quantity of code blocks comprise a first plurality of code block groups of the first quantity of code blocks, a second set of code blocks of the plurality of code blocks are grouped into one or more code block groups comprising a second quantity of code blocks, the one or more code block groups of the second quantity of code blocks comprise a second plurality of code block groups of the second quantity of code blocks, the first quantity of code blocks is different from the second quantity of code blocks, each code block group comprises a distinct subset of code blocks of the plurality of code blocks, and each code block group of the one or more code block groups comprising the first quantity of code blocks comprises a same number of code blocks; and receiving an acknowledgement or negative-acknowledgement for each code block group based at least in part on the indication.

15. The method of claim 14, wherein:
the acknowledgement indicates that code blocks within a code block group were successfully decoded; and
the negative-acknowledgement indicates that at least one code block in a code block group was not successfully decoded.

16. The method of claim 14, further comprising:
transmitting an indication of a number of code block groups to be formed, wherein code blocks of the plurality of code blocks are grouped based at least in part on the indication of the number of code block groups to be formed.

17. The method of claim 14, wherein adjacent sets of two or more code blocks of the plurality of code blocks are within a same code block group.

18. The method of claim 17, wherein the adjacent sets of two or more code blocks of the plurality of code blocks are adjacent in a time domain or a frequency domain.

19. The method of claim 14, wherein a code block group comprises multiple code block groups.

20. The method of claim 14, further comprising:
identifying a grouping of the code blocks of the plurality of code blocks based at least in part on a type of service associated with the transport block, or a modulation and coding scheme (MCS) used to transmit the transport block, or any combination thereof.

21. The method of claim 14, wherein the second set of code blocks comprises a remaining set of code blocks that are distributed to one code block group comprising the second quantity of code blocks.

22. The method of claim 14, wherein at least one of the code blocks of the plurality of code blocks is included in two or more code block groups of the first plurality of code block groups.

23. The method of claim 14, wherein each code block group of the second plurality of code block groups comprises a code block from each of the first plurality of code block groups.

24. The method of claim 14, wherein each code block of the plurality of code blocks is distributed to a different combination of code block groups.

25. The method of claim 14, wherein the indication assigns at least one code block of the plurality of code blocks to the first plurality of code block groups.

26. The method of claim 14, further comprising:
determining one or more code blocks for retransmission based at least in part on the indication and the received acknowledgement or negative-acknowledgement for each code block group; and
retransmitting the one or more code blocks based at least in part on the determination.

27. An apparatus for wireless communication, comprising:
means for transmitting a transport block that comprises a plurality of code blocks;
means for transmitting an indication to group code blocks of the plurality of code blocks of the transport block for feedback reporting, wherein:
a first set of code blocks of the plurality of code blocks are grouped into one or more code block groups comprising a first quantity of code blocks,
the one or more code block groups of the first quantity of code blocks comprise a first plurality of code block groups of the first quantity of code blocks,
a second set of code blocks of the plurality of code blocks are grouped into one or more code block groups comprising a second quantity of code blocks,
the one or more code block groups of the second quantity of code blocks comprise a second plurality of code block groups of the second quantity of code blocks,
the first quantity of code blocks is different from the second quantity of code blocks,
each code block group comprises a distinct subset of code blocks of the plurality of code blocks, and
each code block group of the one or more code block groups comprising the first quantity of code blocks comprises a same number of code blocks; and
means for receiving an acknowledgement or negative-acknowledgement for each code block group based at least in part on the indication.

28. The apparatus of claim 27, further comprising:
means for transmitting an indication of a number of code block groups to be formed, wherein code blocks of the plurality of code blocks are grouped based at least in part on the indication of the number of code block groups to be formed.

29. The apparatus of claim 27, further comprising:
means for identifying a grouping of the code blocks of the plurality of code blocks based at least in part on a type of service associated with the transport block, or a modulation and coding scheme (MCS) used to transmit the transport block, or any combination thereof.

30. A non-transitory computer-readable medium storing code for wireless communication, the code comprising instructions executable by one or more processors to:
transmit a transport block that comprises a plurality of code blocks;
transmit an indication to group code blocks of the plurality of code blocks of the transport block for feedback reporting, wherein:
a first set of code blocks of the plurality of code blocks are grouped into one or more code block groups comprising a first quantity of code blocks,
the one or more code block groups of the first quantity of code blocks comprise a first plurality of code block groups of the first quantity of code blocks,
a second set of code blocks of the plurality of code blocks are grouped into one or more code block groups comprising a second quantity of code blocks,
the one or more code block groups of the second quantity of code blocks comprise a second plurality of code block groups of the second quantity of code blocks,
the first quantity of code blocks is different from the second quantity of code blocks,
each code block group comprises a distinct subset of code blocks of the plurality of code blocks, and
each code block group of the one or more code block groups comprising the first quantity of code blocks comprises a same number of code blocks; and
receive an acknowledgement or negative-acknowledgement for each code block group based at least in part on the indication.

\* \* \* \* \*